(12) United States Patent
Bhaskarabhatla

(10) Patent No.: US 7,925,088 B2
(45) Date of Patent: Apr. 12, 2011

(54) SYSTEM, METHOD AND APPARATUS FOR AUTOMATIC SEGMENTATION AND ANALYSIS OF INK STREAM

(75) Inventor: Ajay Bhaskarabhatla, Pittsburg, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 903 days.

(21) Appl. No.: 11/884,747

(22) PCT Filed: Feb. 23, 2005

(86) PCT No.: PCT/IN2005/000061
§ 371 (c)(1),
(2), (4) Date: Aug. 21, 2007

(87) PCT Pub. No.: WO2006/090406
PCT Pub. Date: Aug. 31, 2006

(65) Prior Publication Data
US 2008/0159625 A1 Jul. 3, 2008

(51) Int. Cl.
*G06K 9/34* (2006.01)
(52) U.S. Cl. ........................................ 382/179
(58) Field of Classification Search .............. 382/173, 382/177, 179, 181, 186–188, 200, 202–203, 382/256, 312–316; 178/18.01–18.11; 345/156–158, 345/162–167, 179–183, 441, 467, 469; 715/863
See application file for complete search history.

(56) References Cited

U.S. PATENT DOCUMENTS

| | | | | |
|---|---|---|---|---|
| 4,680,804 A * | 7/1987 | Kuzunuki et al. | ............. | 382/185 |
| 5,001,765 A | 3/1991 | Jeanty et al. | | |
| 5,583,946 A * | 12/1996 | Gourdol | ......................... | 382/187 |
| 5,684,509 A | 11/1997 | Hatanaka et al. | | |
| 6,021,218 A * | 2/2000 | Capps et al. | ................... | 382/187 |
| 6,275,611 B1 | 8/2001 | Parthasarathy | | |
| 6,385,350 B1 * | 5/2002 | Nicholson et al. | ............ | 382/309 |
| 6,587,587 B2 | 7/2003 | Altman et al. | | |
| 7,447,360 B2 * | 11/2008 | Li et al. | ......................... | 382/186 |
| 2002/0171689 A1 | 11/2002 | Fox et al. | | |
| 2003/0086611 A1 | 5/2003 | Loudon et al. | | |
| 2003/0214531 A1 | 11/2003 | Chambers et al. | | |
| 2003/0214536 A1 | 11/2003 | Jarrett et al. | | |
| 2003/0215142 A1 | 11/2003 | Gounares et al. | | |
| 2003/0215145 A1 | 11/2003 | Shilman et al. | | |

FOREIGN PATENT DOCUMENTS
EP 1 331 592 7/2003
WO 03/025829 3/2003

OTHER PUBLICATIONS

Bhaskarabhatla et al, "Experiences in Collection of Handwriting Data for Online Handwritting Recognition in Indic Scripts," 4th International Conference on Language Resources and Evaluation, May 28, 2004, Online, http://www.hpl.hp.com/techreports/2005/HPL-2005-23.pdf.

* cited by examiner

*Primary Examiner* — Jose L Couso

(57) ABSTRACT

A technique that provides for real-time segmentation of hand written traces during data entry into a computer. In one example embodiment, this is achieved by computing a current trace bounding contour as a function of a drawn current trace. A current selection bounding contour is then computed as a function of the drawn current trace and the current trace bounding contour. The current selection bounding contour includes one or more previously drawn traces. The computed current trace bounding contour is then compared with the computed current selection bounding contour. The hand written traces including the current trace and the one or more previously drawn traces are then dynamically segmented as a function of the comparison.

31 Claims, 19 Drawing Sheets

SYSTEM, METHOD AND APPARATUS FOR AUTOMATIC SEGMENTATION AND ANALYSIS OF INK STREAM

TECHNICAL FIELD OF THE INVENTION

The present invention relates generally to a user interface in a computer system, and more particularly relates to capturing and manipulating of handwritten traces during data entry into a computer.

BACKGROUND OF THE INVENTION

Pen-based computers in which the pen replaces the keyboard and/or mouse as the primary input device have become well known. Such systems provide a digitizing pad and pen for the user to input information. The information is input in the form of traces or graphic representations of traces. The computer monitors the movement of the pen and creates a trace when the pen comes within a predefined proximity of or in contact with the digitizing pad. The computer follows the movement of the pen across the digitizing pad while simultaneously extending the trace, and ends the trace when the pen is removed or moved out of proximity from the digitizing pad.

A number of systems for electronically capturing, manipulating, and displaying handwritten traces are known. These systems capture traces and group the traces into characters, sub-words, words, sentences and so on. One current solution captures, overlay traces, and interprets traces as text. However, this solution requires that the capture area be predefined. Consequently, this solution does not accommodate ink stream input outside the predefined writing area. The term "ink stream" refers to a series of a sequence of drawn traces. The ink stream is generated by a digitizer in a sequence of traces.

In addition, when filling out in the predefined capture area, a user is generally confronted with very small regions, as these regions are designed to receive text from a keyboard. Further, this technique can result in problems, such as (1) not being able to write in place, (2) inefficient use of an active area of a digitizer, which can require allocating separate predefined capture areas for writing and displaying, (3) requiring to define boxes (predefined writing areas) so that the characters, subwords, and/or words can be entered in the boxes, (4) inability of these boxes to accommodate larger writing styles of users, and so on. Therefore, this technique can result in requiring large writing areas to accommodate all writing styles of different users. In addition, the writing areas required to write text units can vary widely for different scripts. Furthermore, in a digital document, where the ink stream follows a random pattern, it is difficult to allocate separate predefined writing areas as they follow no pattern.

Another current solution analyzes ink stream using complex algorithms. Such algorithms require relatively structured ink stream input in order to function in an acceptable manner. For example, users of such systems typically are admonished to "write neatly", "write between the lines" in a horizontal orientation, and/or write in a specified ink stream input area. Failure to follow these instructions may cause recognition error or other error when the ink stream is presented to an associated handwriting recognition engine. Also, some users can quickly become frustrated with these errors and limitations of the system.

Another current solution groups traces using a lasso tool after the handwritten traces are completed. However, this solution requires the user to explicitly select the group after completing the handwritten traces. There is also another solution that dynamically groups a growing sequence of traces by resizing the predefined capture area radially outwards. However, it can only accommodate traces that start within the predefined capture area. This solution cannot support grouping of traces that start outside the current predefined capture area. In addition, the inking and rendering of the traces are interrupted when using this technique. Furthermore, the solution only allows grouping of traces that are inside the predefined capture area and does not address segmentation of a drawn ink stream that falls outside the predefined capture area.

SUMMARY OF THE INVENTION

According to an aspect of the subject matter, there is provided a method for real-time segmenting of a drawn ink stream, the method including the steps of computing a current trace bounding contour as a function of a drawn current trace, computing a current selection bounding contour as a function of the drawn current trace and the current trace bounding contour, wherein the current selection bounding contour includes one or more previously drawn traces, comparing the computed current trace bounding contour with the computed current selection bounding contour, and real-time segmenting of an ink stream including the current trace and the one or more previously drawn traces as a function of the comparison.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "sub-word unit" in Devanagari script refers to an "akshara" or "samyukthakshara". The term "sub-word" unit refers to a member of alphabetic, legographic, and/or phonetic/syllabic character set, which includes syllables, alphabets, numerals, punctuation marks, consonants, consonant modifiers, vowels, vowel modifiers, and special characters, and/or any combination thereof. The choice of the sub-word unit can depend on the language itself. For example, languages with a very well defined and small number of syllables may benefit from syllable-sized unit.

The term "segmentation" refers to a process of identifying marks in the sequence of drawn traces such that the collection of traces separated by these marks will share a certain common property such as (1) the collection of traces can be interpreted as a work in a certain script, (2) the collection of traces represent drawings, and so on. The terms "ink stream" and "traces" are used interchangeably throughout the document.

In addition, the term "trace bounding contour" refers to a boundary of a drawn trace. Further, the term "selection bounding contour" refers to a boundary of previously grouped traces.

Figure 1:
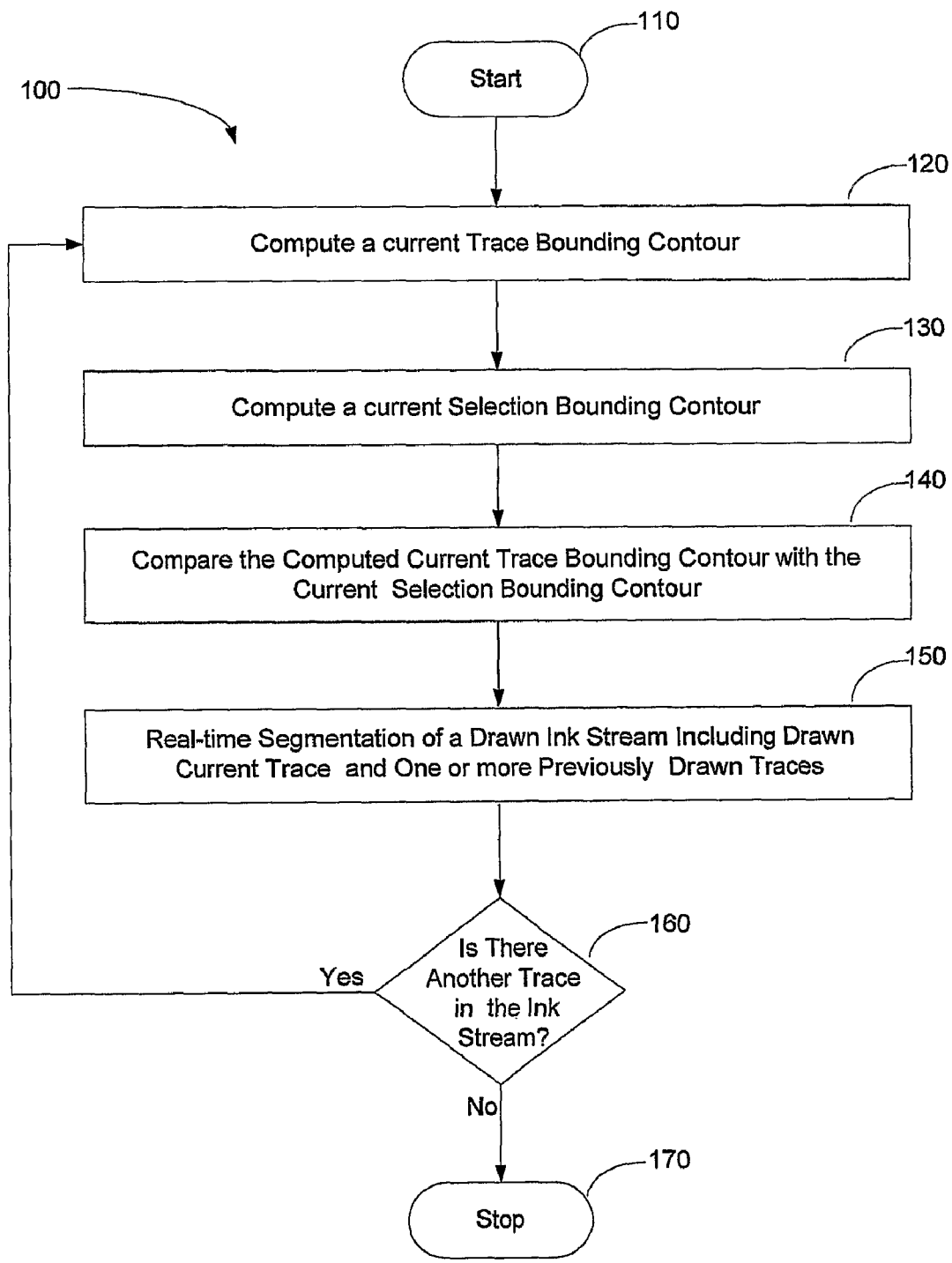
FIG. 1 is a flowchart illustrating an example method for real-time automatic segmentation and analysis of a drawn ink stream according to an embodiment of the present subject matter.

FIG. 1 illustrates an example method 100 for real-time automatic segmentation and analysis of a drawn ink stream. At steps 110 and 120, this example method 100 begins by computing a current trace bounding contour as a function of a drawn current trace. In some embodiments, the method 100 begins by initializing the current trace bounding contour upon an occurrence of a pen-down event by a stylus on a digitizer. The current trace is then drawn by using the stylus on the digitizer. The initialized current trace bounding contour is then dynamically computed and updated as the current trace is drawn on the digitizer based on the drawn current trace.

Figure 2:
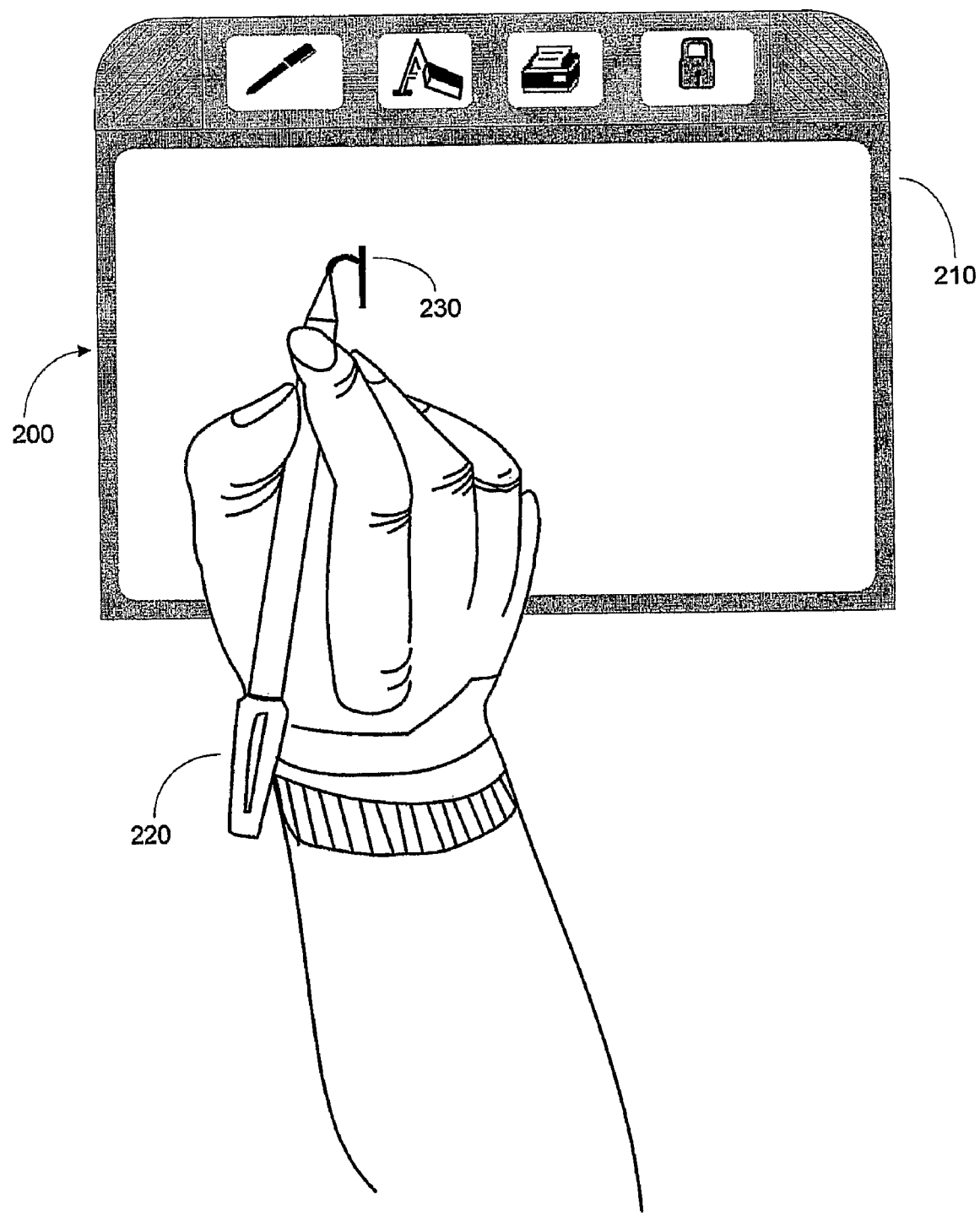
FIGS. 2-10 illustrate graphical representations of a screen display showing drawing of a stream of traces and automatic segmentation performed according to an embodiment of the present subject matter.

Referring now to FIG. 2, there is illustrated a screen shot 200 of drawing a current trace 230 using a stylus 220 on the digitizer 210. The drawn current trace can include a trace associated with a drawing, musical tone, text, mathematical formula, graph, symbol, and so on. As shown in FIG. 2, the drawing of the current trace 230 begins upon a pen-down event using the stylus 220 on the digitizer 210, the current trace bounding contour is then initialized and dynamically computed and updated as a function of the drawn current trace 230.

In some embodiments, the drawn current trace 230 along with the computed and updated current trace bounding contour is displayed substantially simultaneously on the digitizer 210. In the exemplary screen shot 200 shown in FIG. 2, the current trace bounding contour is not shown. It can be envisioned that the current trace bounding contour, which substantially surrounds the drawn current trace 230 can be displayed in a first contrasting color on the digitizer 210.

The trace bounding contour is computed, updated and displayed as a function of the current trace being drawn by a user using the stylus on the digitizer.

At step 130, a current selection bounding contour is computed as a function of the drawn current trace and the computed current trace bounding contour upon a pen-up event by the stylus. The current selection bounding contour can include one or more previously drawn traces. In some embodiments, the step 120 begins by determining whether the drawn current trace 230 is a first trace in the ink stream being drawn upon an occurrence of a pen-up event by the stylus. The current selection bounding contour is initialized and computed as a function of the drawn current trace and the current trace bounding contour if the drawn current trace is the first trace in the ink stream. In these embodiments, the drawn current trace along with the computed current selection bounding contour is displayed on the digitizer. The computed current selection bounding contour is displayed to provide a visual indication to the user that the drawn current trace is being included in a current segment.

Figure 3:
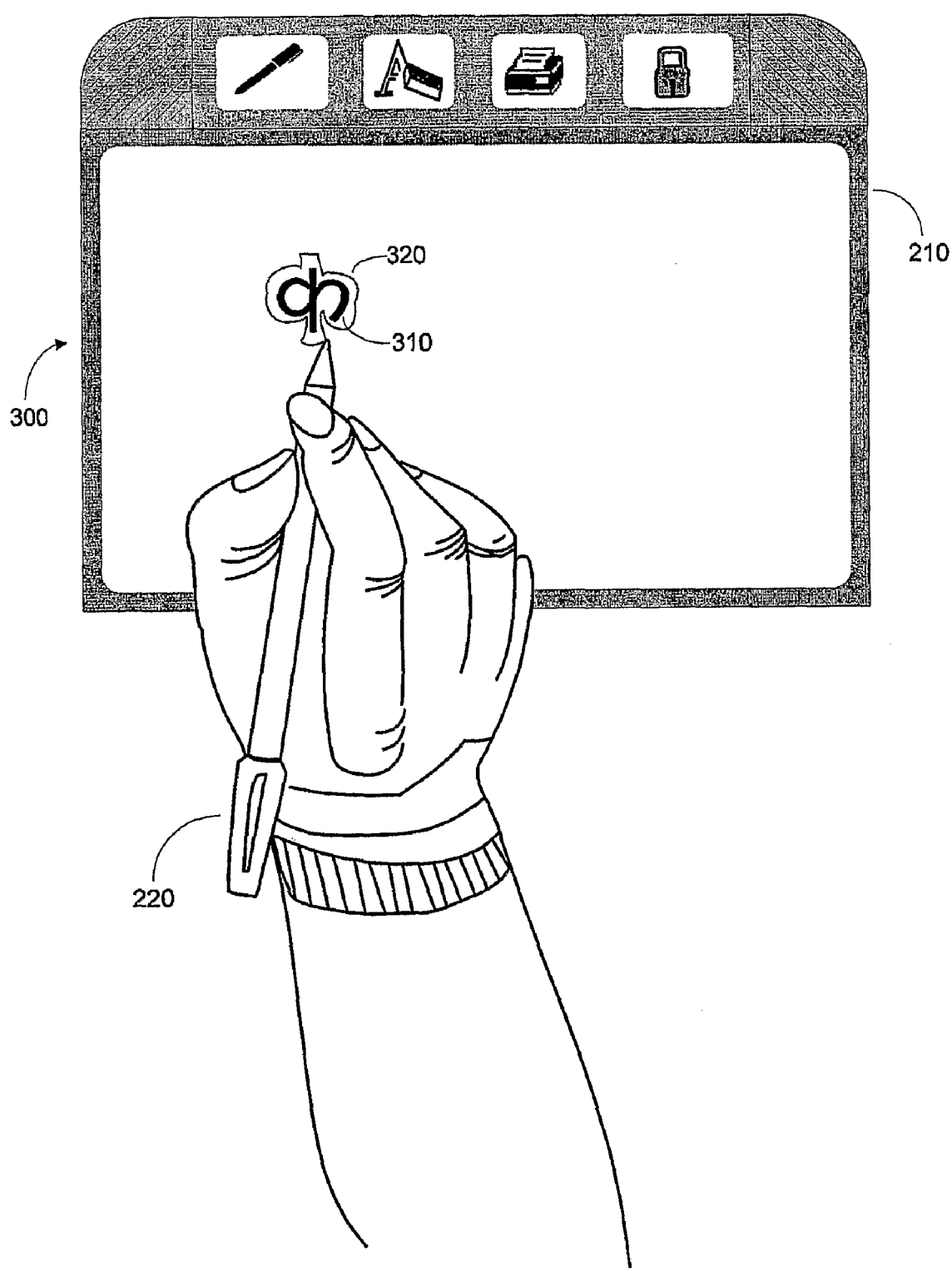

Referring now to FIG. 3, there is illustrated a screen shot 300 of the drawn current trace 310 substantially surrounded by the current selection bounding contour 320 on the digitizer 210 upon a pen-up event by the stylus 220. As shown in FIG. 3, upon the pen-up event by the stylus 220, the drawn current trace 310 is checked whether it is the first trace in the ink stream and then the updated current selection bounding contour 320 along with the drawn current trace 310 is displayed on the digitizer 210 to indicate the start of the segmentation. In the example embodiment shown in FIG. 3 the drawn current trace 310 is the first trace of an akshara, i.e., a character, of Devanagari script.

The selection bounding contour 320 includes one or more previously drawn traces, unless the drawn current trace is the first trace, that are within a threshold of nearness and/or overlapping parameters. At any point in time, the real-time segmentation scheme compares the current trace bounding contour and the current selection bounding contour to segment the drawn ink stream including the drawn current trace and the one or more previously drawn traces.

At step 140, the computed current trace bounding contour is compared with the computed current selection bounding contour. At step 150 the drawn ink stream including the current trace and the one or more previously drawn traces is dynamically segmented as a function of the comparison.

In some embodiments, spatial parameters between the current trace bounding contour and the current selection bounding contour are computed if the drawn current trace is not the first trace. The current selection bounding contour is then computed and updated as a function of the computed spatial parameters. The current trace bounding contour is then removed and the drawn current trace and the one or more previously drawn traces along with the updated current selection bounding contour are displayed on the digitizer. In these embodiments, the spatial parameters are based on parameters, such as overlap and nearness. In these embodiments, the updated and displayed current selection bounding contour substantially surrounds the current trace along with the one or more previously drawn traces indicating that the current trace along with the one or more previously drawn traces are included in the current segment.

In some embodiments, the computed spatial parameters are compared to a threshold value to determine whether the computed spatial parameters are greater than the threshold value. The drawn current trace and the one or more previously drawn traces along with the updated and computed current selection bounding contour are displayed on the digitizer if the computed spatial parameter is not greater than the threshold value indicating that the drawn current trace along with the one or more previously drawn traces are part of the current segment.

In these embodiments, the one or more previously drawn traces along with a previous selection bounding contour are displayed on the digitizer as the current segment. The previous selection bounding contour is then removed from the digitizer indicating the completion of the formation of the current segment. The one or more previously drawn traces are then displayed in a third contrasting color to complete the formation of the segmentation using the previously drawn on one or more traces. In some embodiments, the current segment along with the included one or more previously drawn traces are stored in memory. Also in these embodiments, the current segment is inputted into a handwriting recognition engine for character recognition. Further, the above-described steps are repeated for the drawn current trace.

In some embodiments, the spatial parameters are designed to be configured by a user to facilitate entry of traces associated with ink stream categories, such as drawing, musical tone, text, symbol, mathematical formula, and graph. In addition, changing spatial parameters allows the user to change the threshold value so that dynamic segmentation characteristics of the above-described segmentation technique can be controlled to the need of a desired ink stream being drawn by the user.

It can be seen in the screen shot 300 shown in FIG. 3 that upon the pen-up event by the stylus 220, the current trace bounding contour (not shown) is updated and replaced by the current selection bounding contour 320, which substantially surrounds the drawn current trace 310 indicating that the drawn current trace is the first trace included in forming the current segment.

At step 160, the method 100 determines whether there is another trace in the ink stream that is being drawn on the digitizer. Based on the determination at 160, the method 100 goes to step 120 and repeats the above-described steps 120-160, if there is a next trace that needs to be drawn as part of the ink stream.

Based on the determination at 160, the method 100 goes to step 170 and stops the real-time segmentation of the ink stream, if there are no other traces in the ink stream. In some embodiments, the method 100 forms the current segment including the drawn current trace along with any of the one or more previously drawn traces. In other embodiments, the current segment along with the included drawn current trace and the one or more previously drawn traces are stored in a database. In some embodiments the drawn current trace is inputted into a character recognition engine for handwriting recognition.

Figure 4:
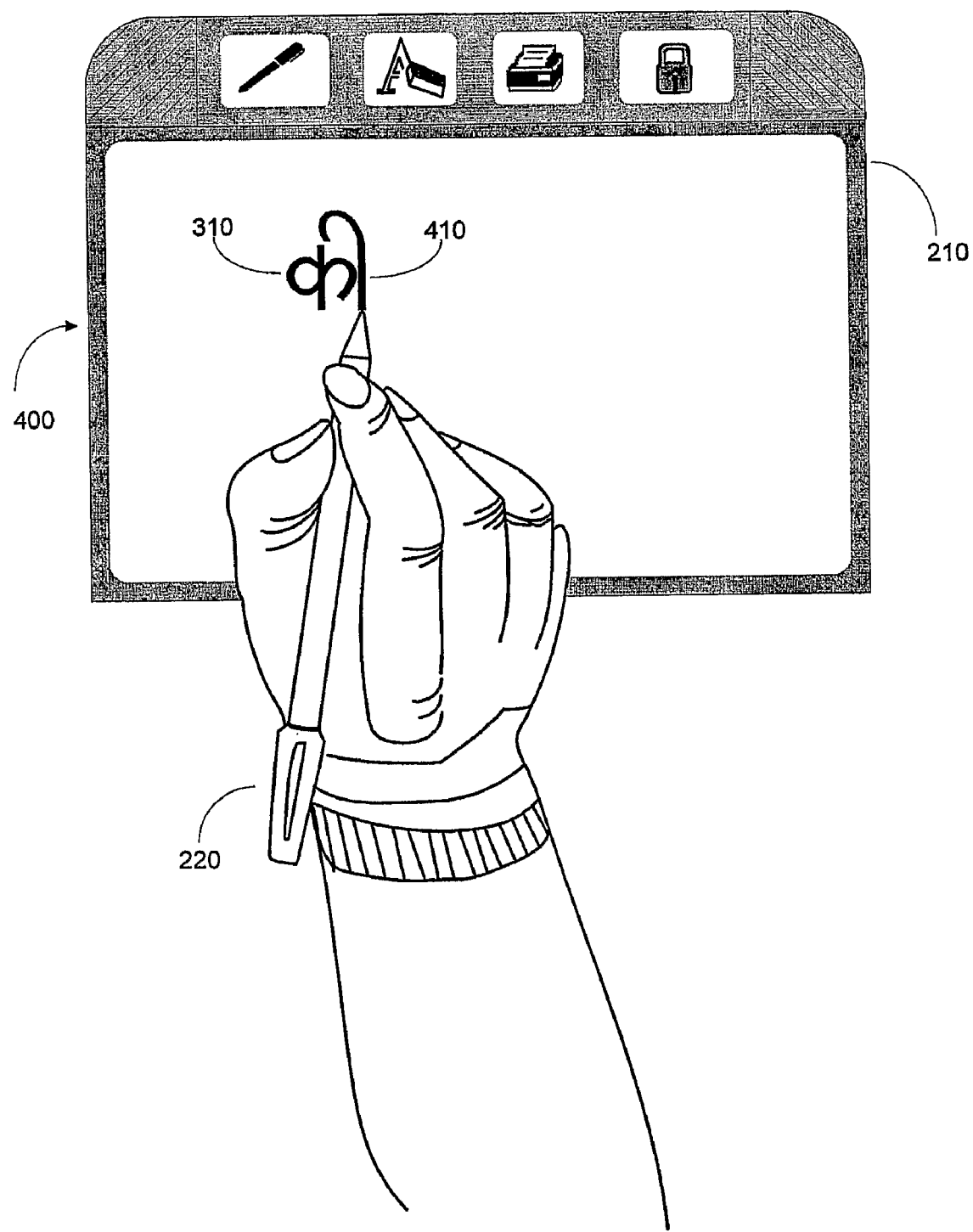

Referring now to FIG. 4, there is illustrated a screen shot 400 that shows the drawing of a current trace 410 after completion of the drawing of the previously drawn current trace 310. It can be seen that the current selection bounding contour is removed from the digitizer 210 while the current trace 410 is being drawn on the digitizer 210.

Figure 5:
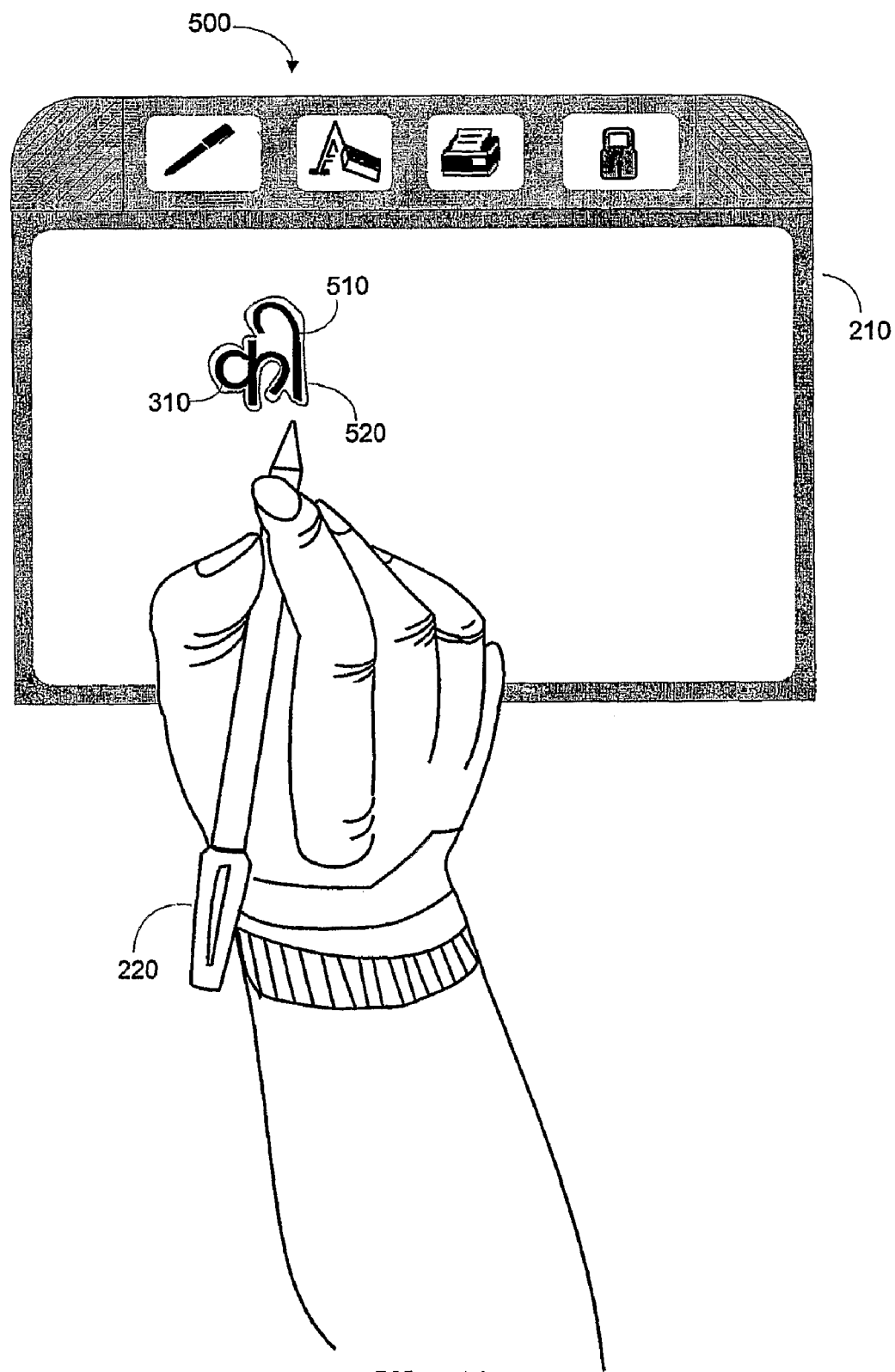

Referring now to FIG. 5, there is illustrated a screen shot 500 that shows updation and formation of the current selection bounding contour 520 that substantially surrounds the drawn current trace 510 and the previously drawn trace 310 upon a pen-up event by the stylus 220 from the digitizer 210.

Figure 6:
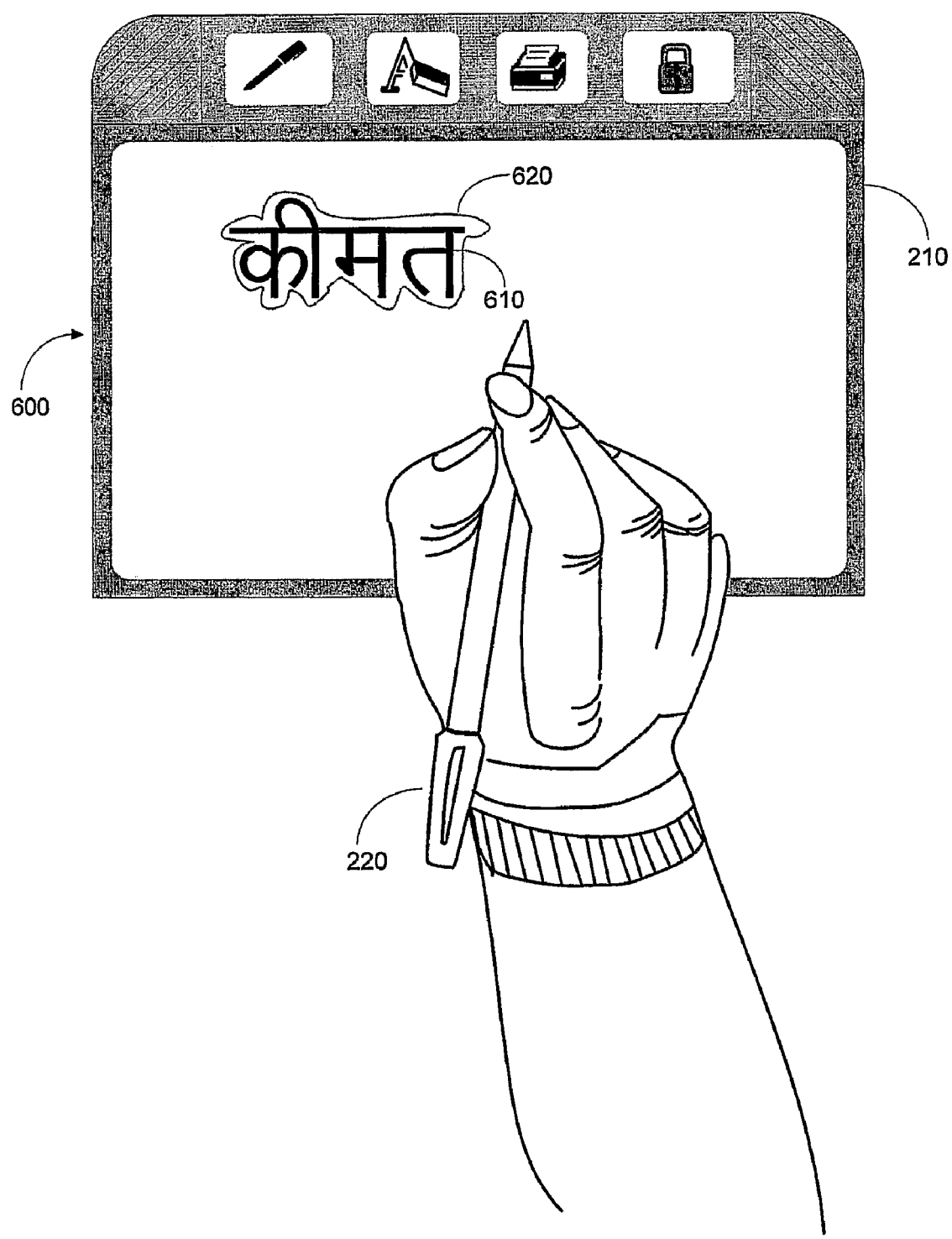

Referring now to FIG. 6, there is illustrated a screen shot 600 that shows the updated and formed current selection bounding contour 620 that substantially surrounds the one or more previously drawn traces 610 upon the pen-up event by the stylus 220.

Figure 7:
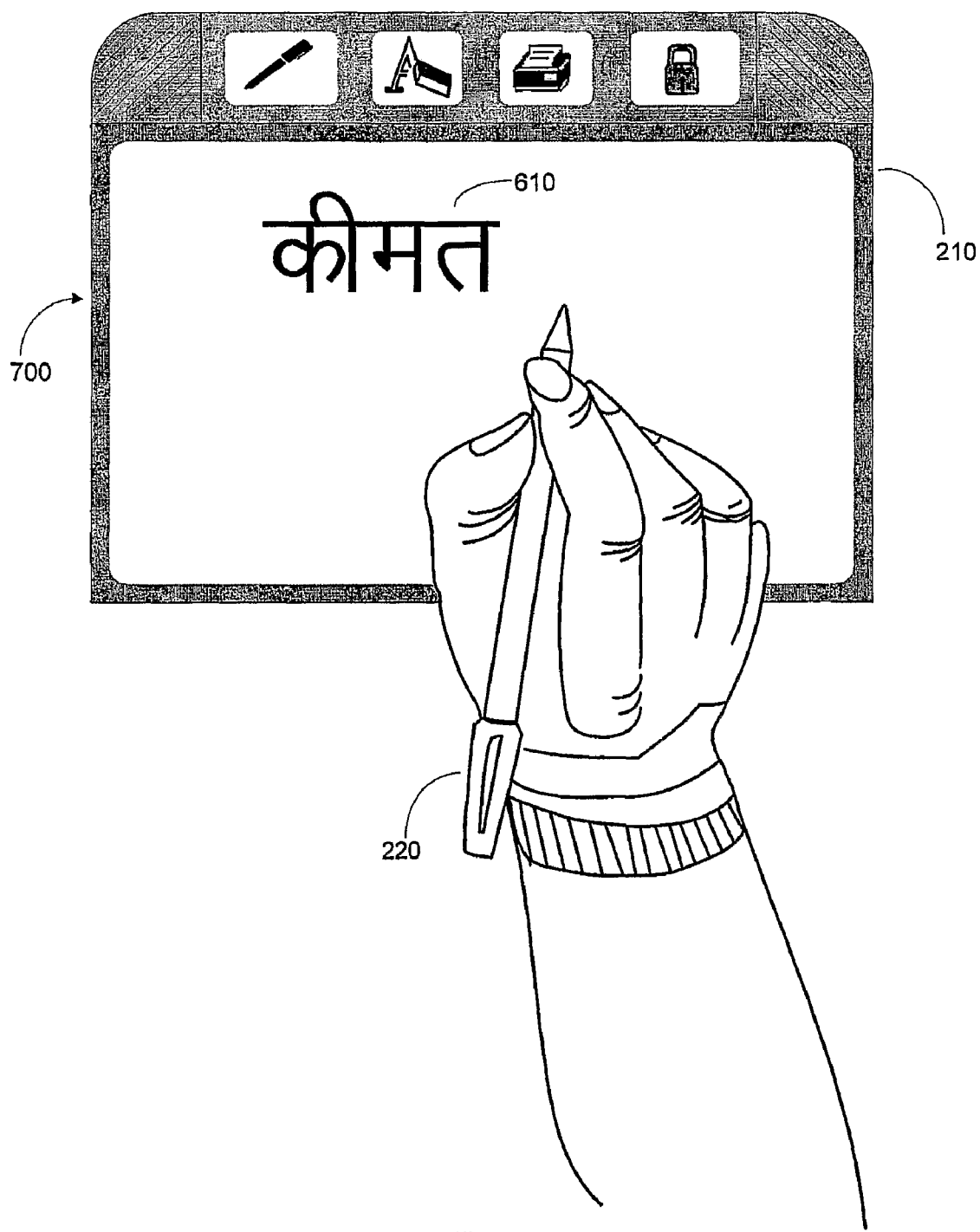
Figure 8:
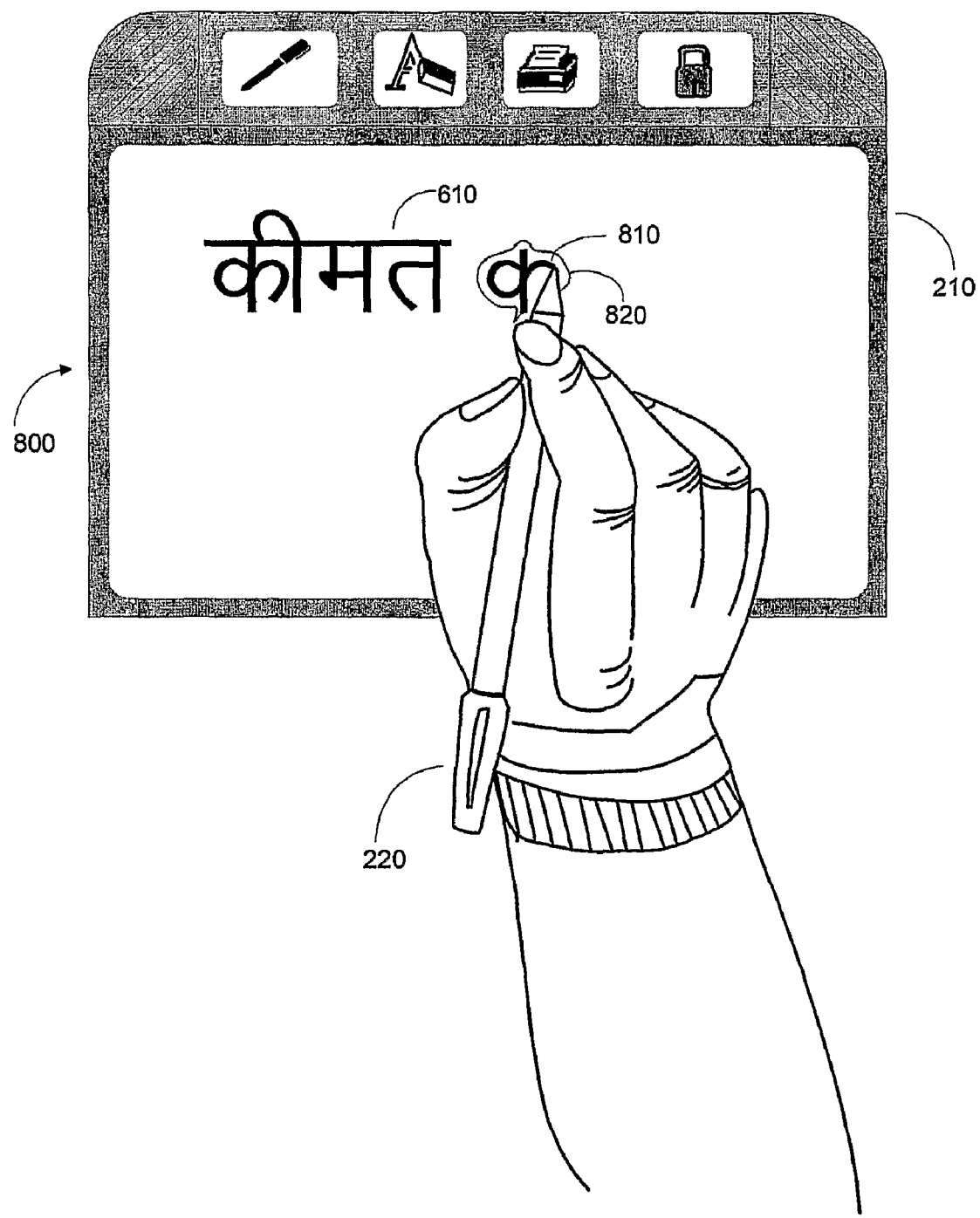
Figure 9:
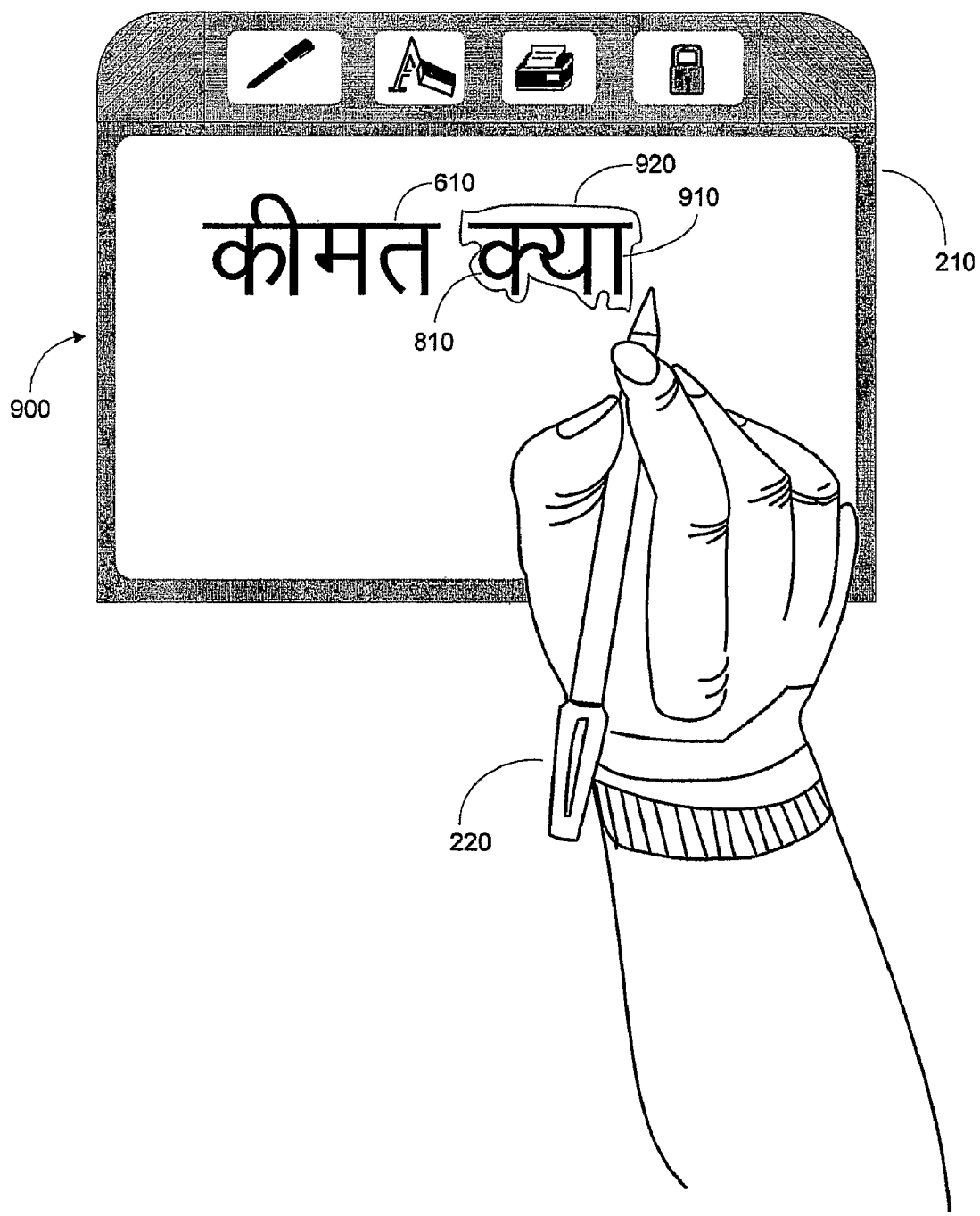

Referring now to FIG. 7, there is illustrated a screen shot 700 that shows the removal of the current selection bounding contour 620 (shown in FIG. 6) from the one or more previously drawn traces 610 upon the pen-down event by the stylus. Referring now to FIG. 8, there is illustrated a screen shot 800 that shows the drawing of the current trace 810 and the initialized and dynamically updated current trace bounding contour 820 as the current trace 810 is being drawn. In these embodiments, the current trace bounding contour can be shown in the first contrasting color on the digitizer 210. Also, it can be seen in FIG. 8 that based on the spatial relationship between the previously formed selection bounding contour 620 (shown in FIG. 6) the segmentation technique described above segments the one or more previously drawn traces 610 as belonging to a previous segment by removing the previously formed selection bounding contour 620 from the digitizer 210. Similarly it can be seen in FIG. 9, the screen shot 900 illustrates combining the drawn current trace 910 with the previously drawn current trace 810 into the current segment by updating and forming a current selection bounding contour 920 upon the pen-up event by the stylus 220. It can be seen in FIG. 9, that the drawn current trace 910 along with the previously drawn current trace 810 are grouped in the current segment based on computing the spatial parameters, such as overlap and nearness between the current trace bounding contour that surrounds the drawn current trace 910 and the current selection bounding contour 820 (shown in FIG. 8).

Figure 10:
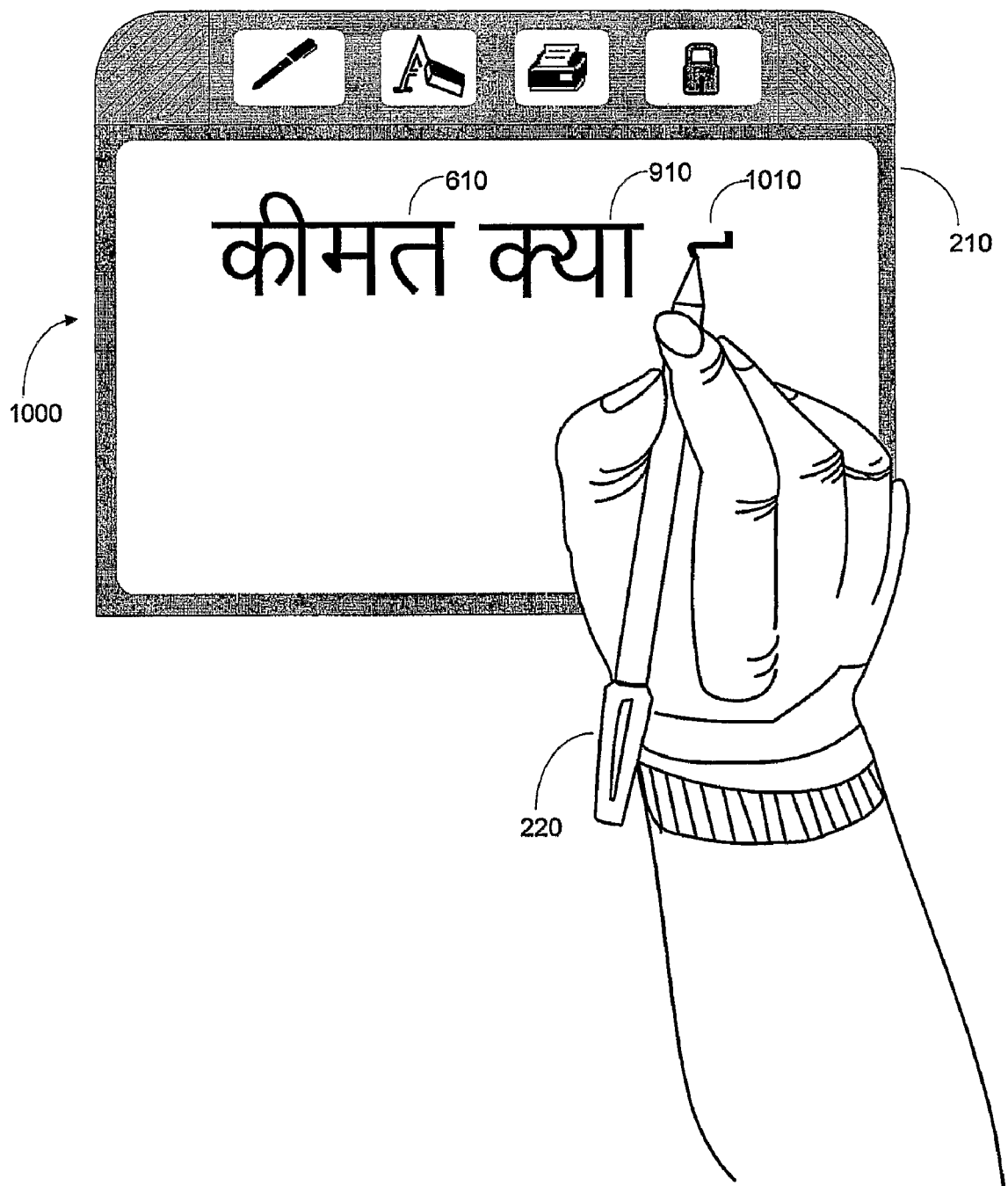

Referring now to FIG. 10, there is illustrated a screen shot 1000 that shows the drawing of a current trace 1010 using the stylus 220 and the start of a new segment which includes the current trace 1010. Also shown in the screen shot 1000 is the completion of the formation of the previous two segments 610 and 910. In some embodiments, the previous two segments can be displayed in different contrasting colors to indicate completion and the formation of the two segments 610 and 910.

Referring now to FIGS. 11-18, there are illustrated screen shots 1100-1800 that show the drawing of traces that belong to two different categories of ink stream and their automatic segmentation. The first category of segmentation is being performed on a graph that is shown in the screen shots 1100-1600 and the second category of segmentation being performed on a text that is shown in screen shots 1700-1800.

Figure 11:
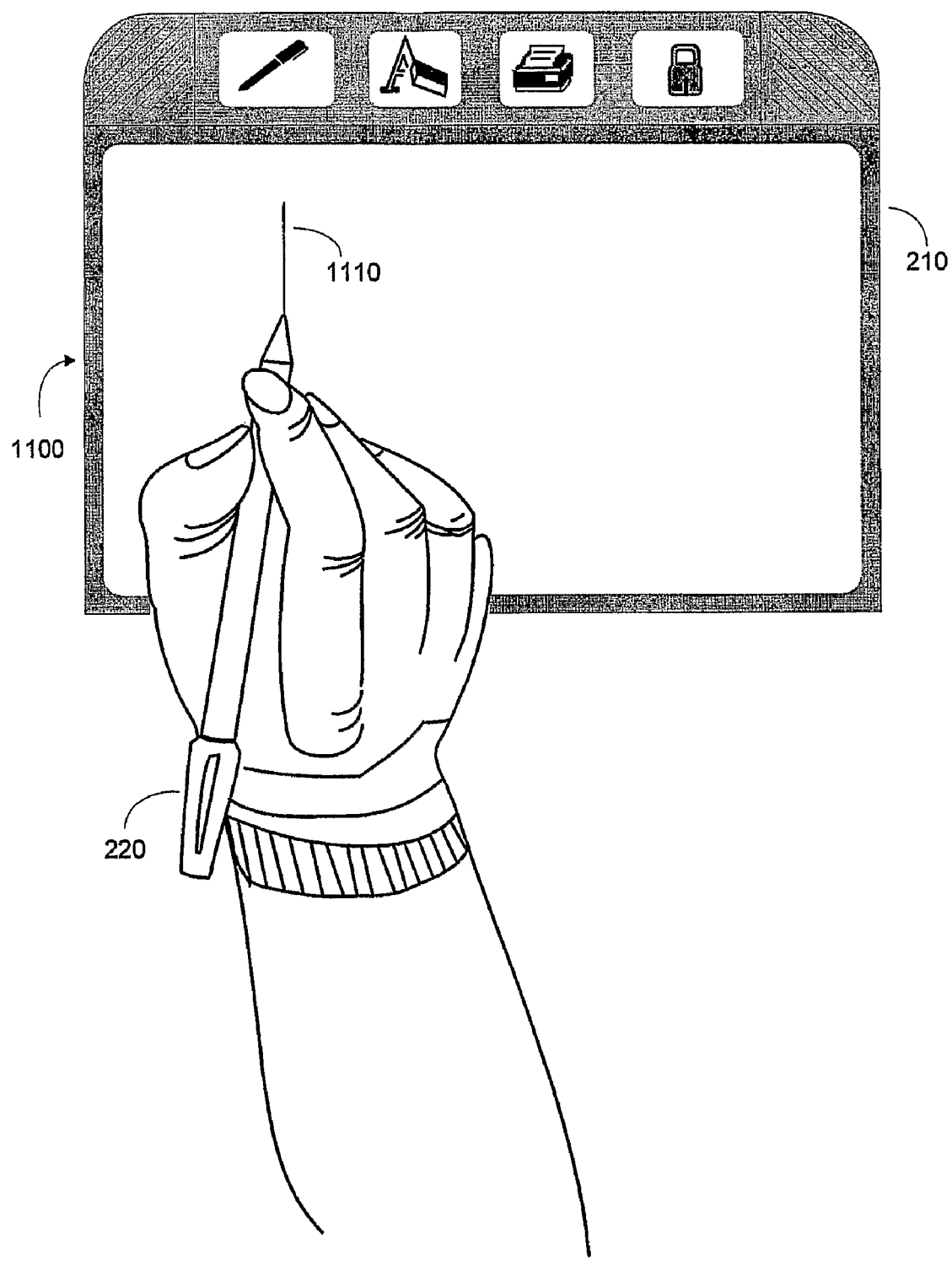
FIGS. 11-18 illustrate graphical representation of a screen display showing drawing of a stream of traces of two different ink stream categories and their automatic segmentation performed according to an embodiment of the present subject matter.
Figure 12:
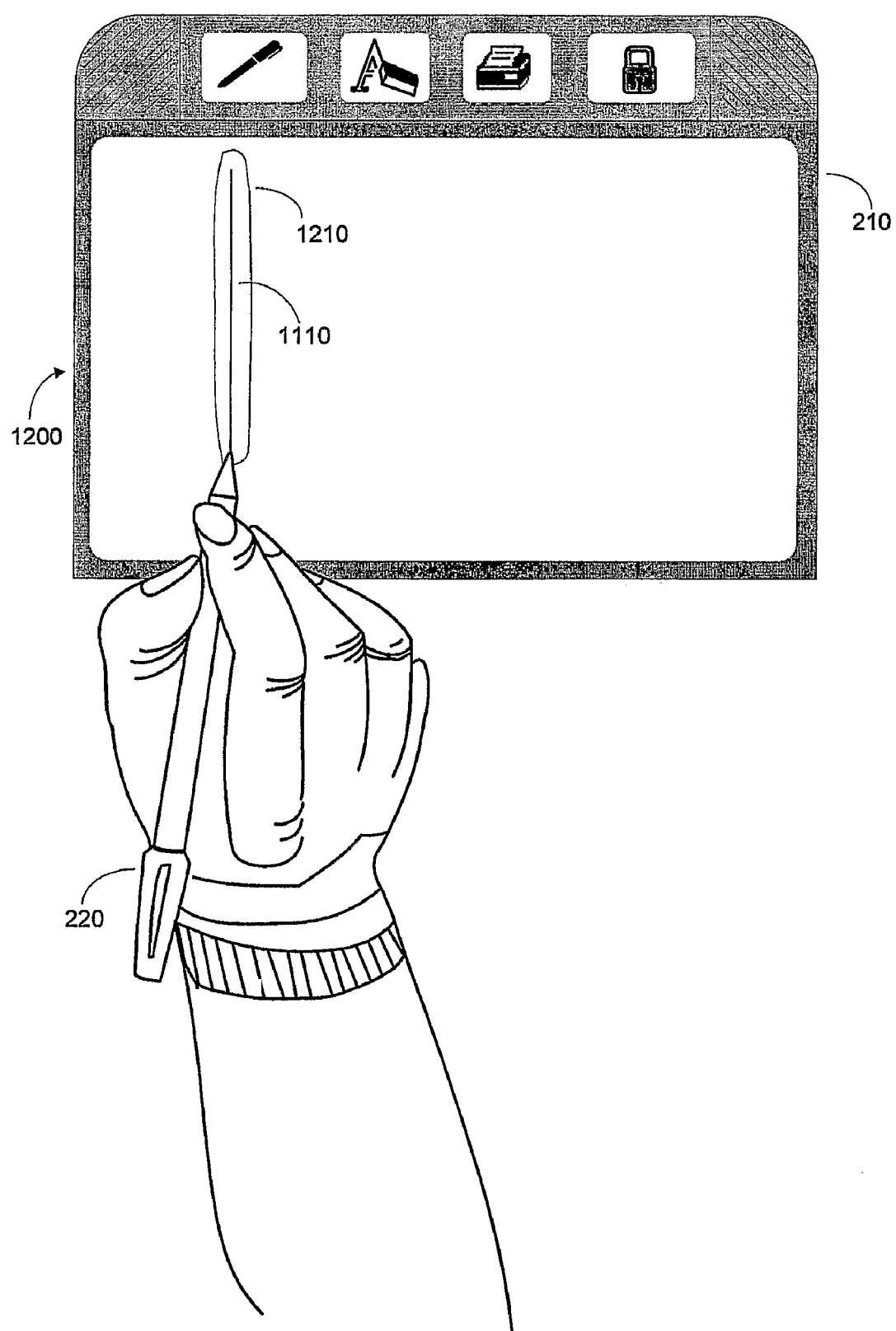

Referring now to FIG. 11, the screen shot 1100 shows the drawing of current trace 1110 on the digitizer 210 using the stylus 220. It can be envisioned that a current trace bounding contour (not shown) is initialized and being dynamically computed and updated as a function of the drawn current trace 1110. Referring now to FIG. 12, the screen shot 1200 shows upon a pen-up event by the stylus 220, which indicates completion of the drawing of the current trace 1110, the computed current trace bounding contour is replaced by initializing and computing a current selection bounding contour 1210, which substantially surrounds the drawn current trace 1110. As shown in FIG. 12, the current trace being the first trace, the computed and displayed current selection bounding contour 1210 only surrounds the drawn current trace 1110 as there are no other traces in the ink stream that needs to be included in the current segment.

Figure 13:
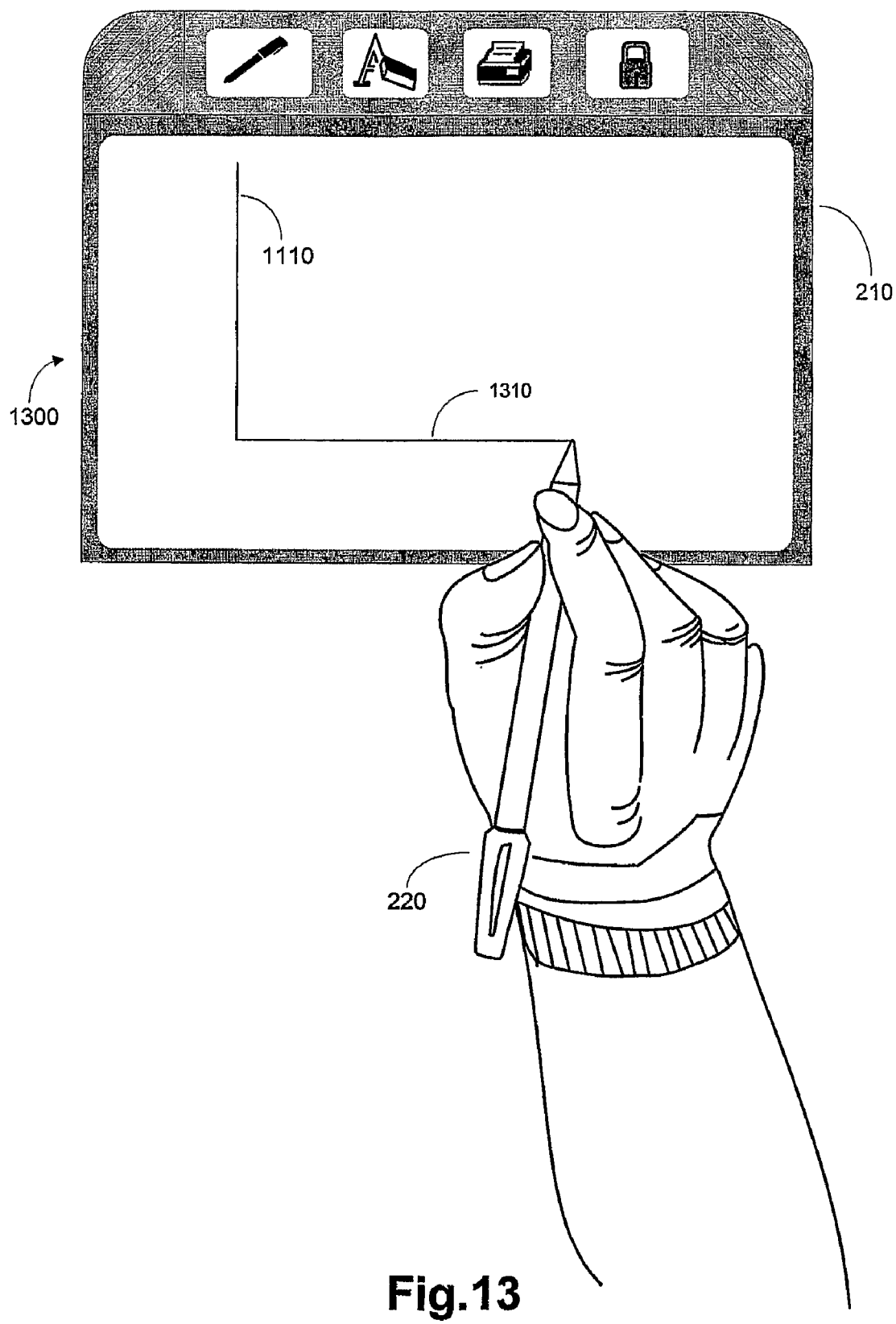

Referring now to FIG. 13, the screen shot 1300 shows the drawing of the next current trace 1310 using the stylus 220 on the digitizer 210. Also shown in FIG. 13 is the previously drawn current trace 1110 along with the next current trace 1310 that is being drawn using the stylus 220. It can be seen in FIG. 13 that while drawing the next current trace 1310, the current selection bounding contour is removed from the display as the current trace bounding contour (not shown) is computed and updated.

Figure 14:
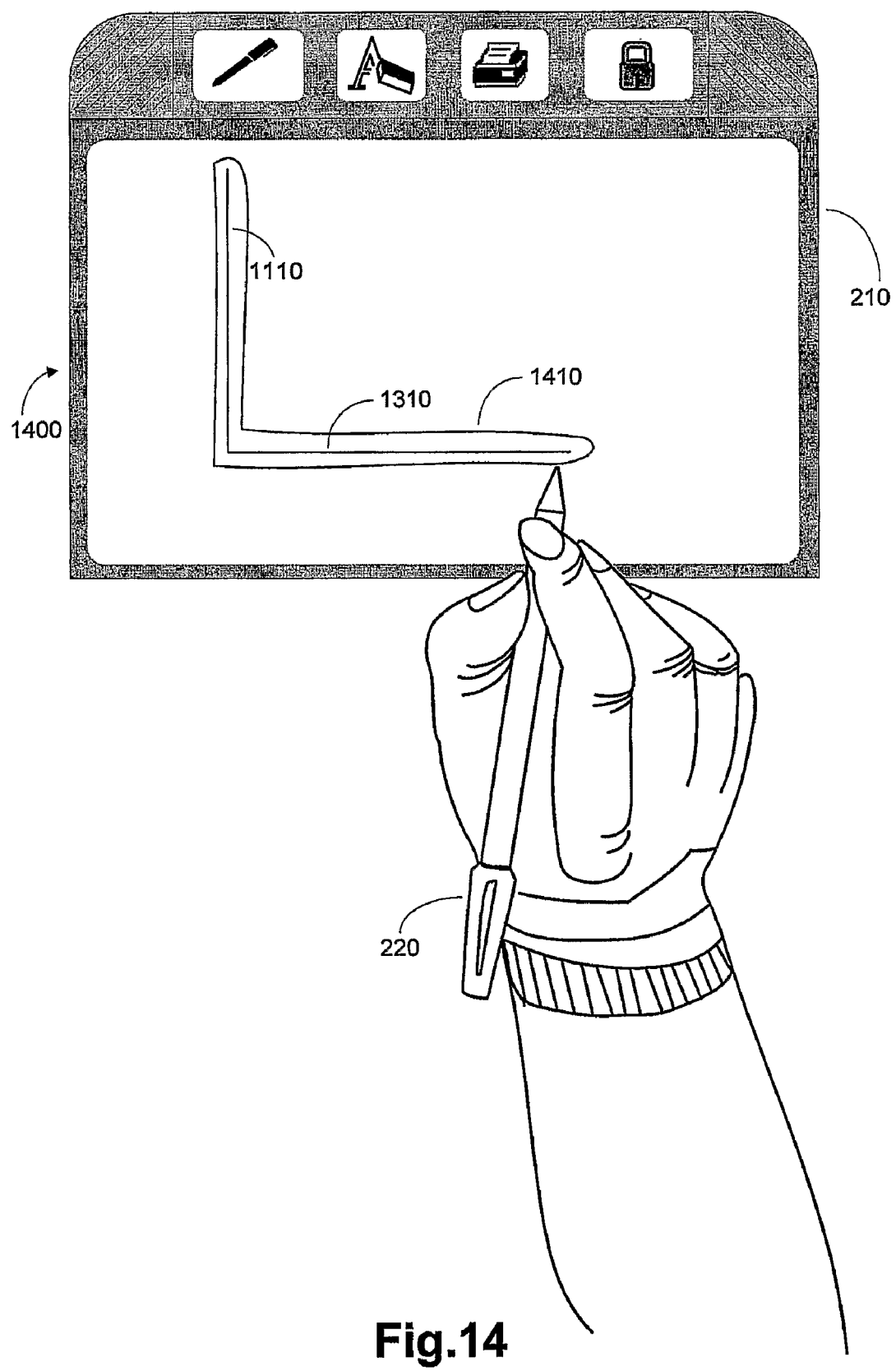

Referring now to FIG. 14, the screen shot 1400 shows the computed current selection bounding contour 1410 that is formed as a function of the current trace bounding contour (not shown) that substantially surrounds the next current trace 1310 and the previously drawn current trace 1110. As shown in FIG. 14, based on computing the spatial parameters between the current trace bounding contour that is computed as a function of the next current trace 1310 and the previously computed current selection bounding contour 1210 (shown in FIG. 12), the above described segmentation technique includes the previously drawn current trace 1110 and the drawn next current trace 1310 as belonging to the current segment.

Figure 15:
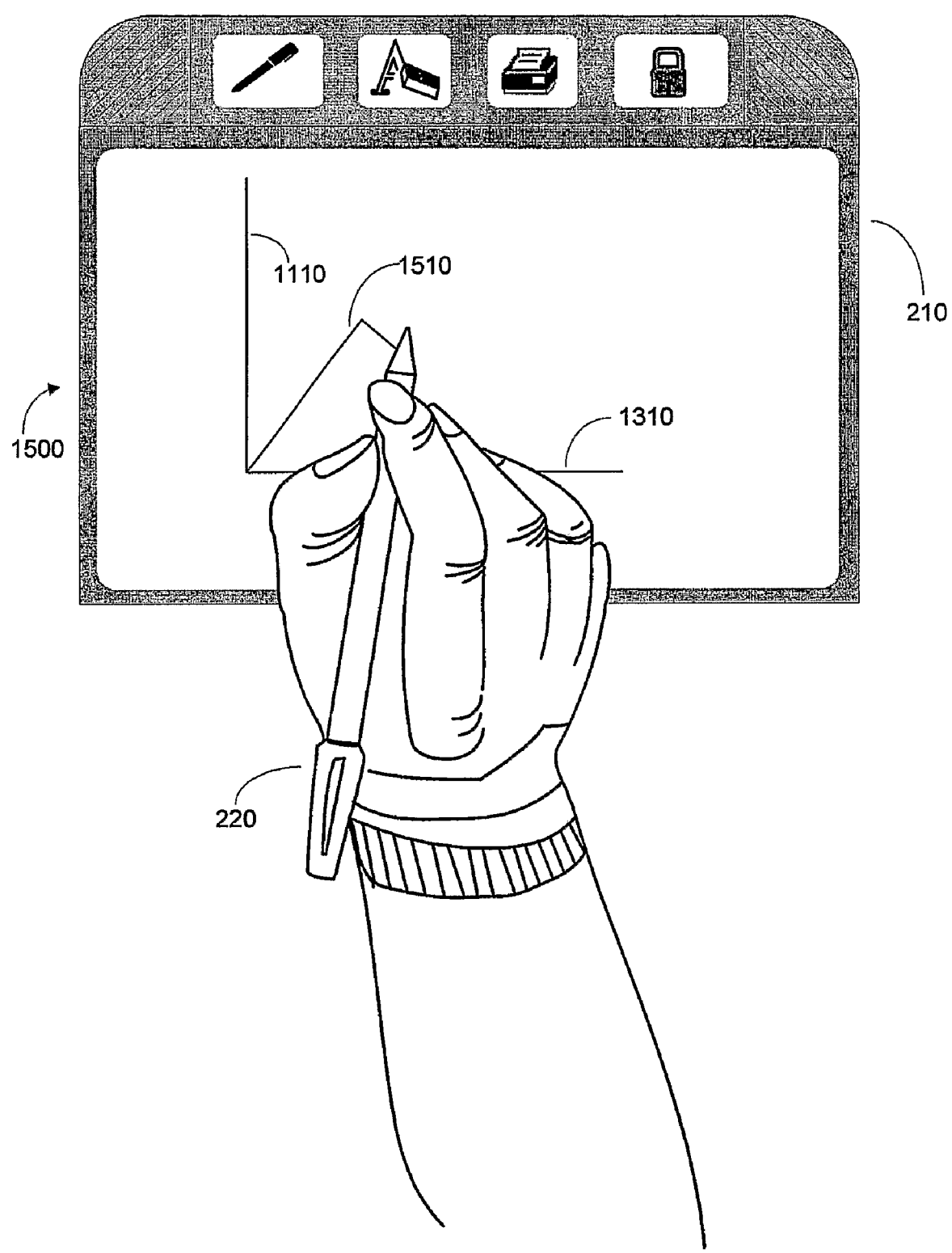
Figure 16:
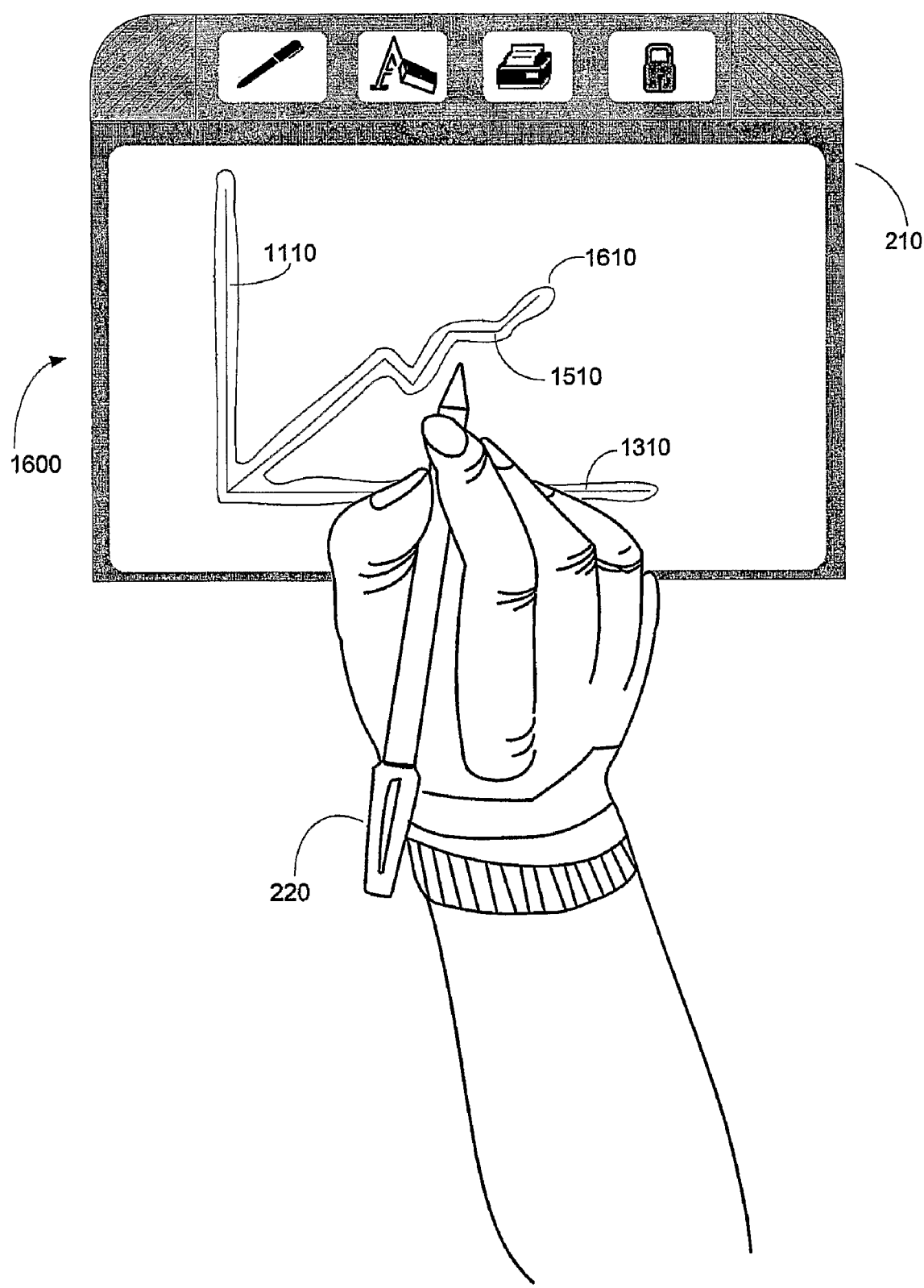

Referring now to FIGS. 15-16, the screen shots 1500 and 1600, respectively, illustrate the grouping of the drawn next current trace 1510 along with the previously drawn current traces 1110 and 1310 indicating the three traces 1110, 1310, and 1510 as belonging to the current segment. Therefore, the current selection bounding contour 1610 is computed and updated to include all the three drawn traces 1110, 1310, and 1510 to indicate that they all belong to the current segment.

Figure 17:
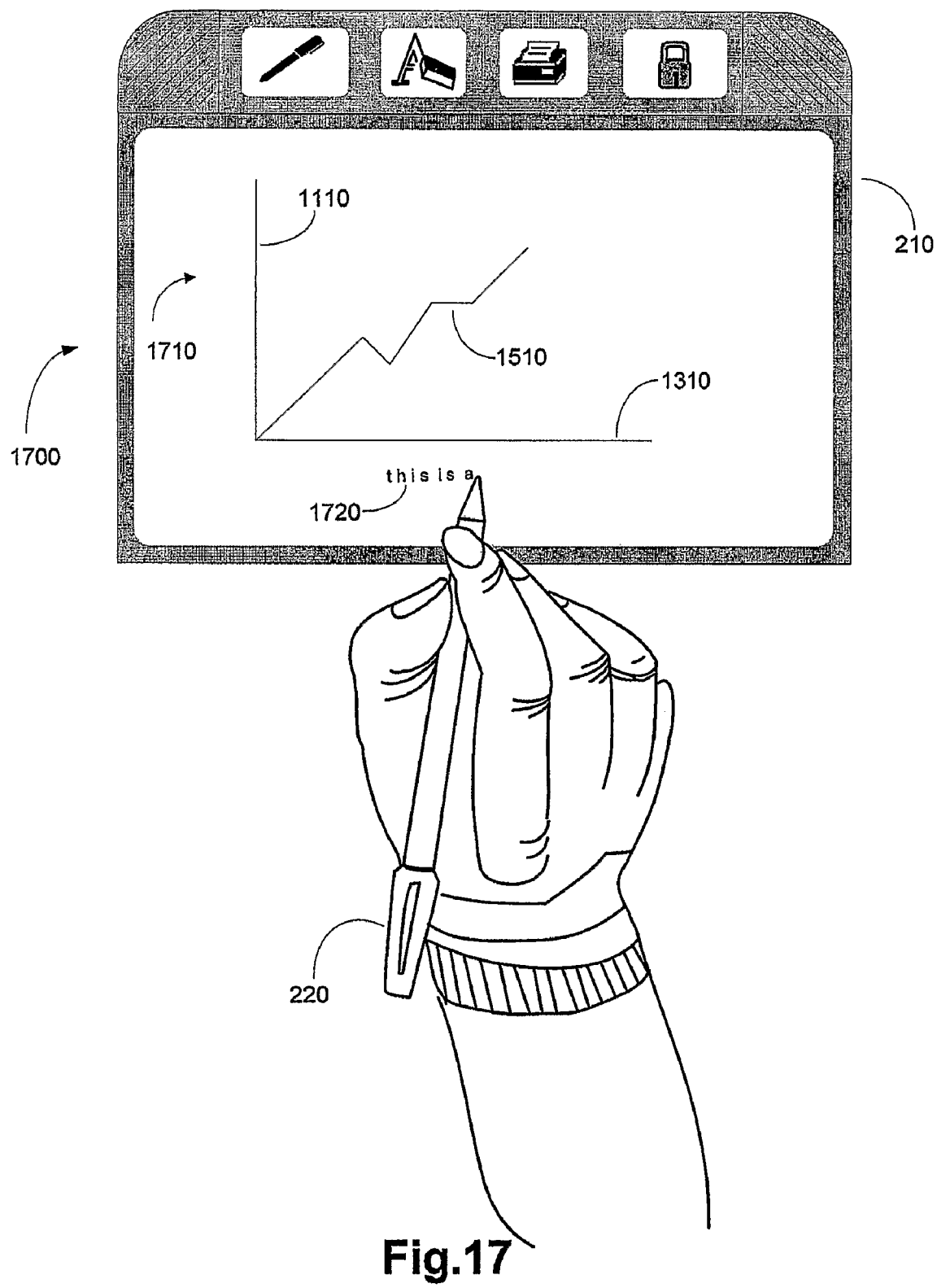
Figure 18:
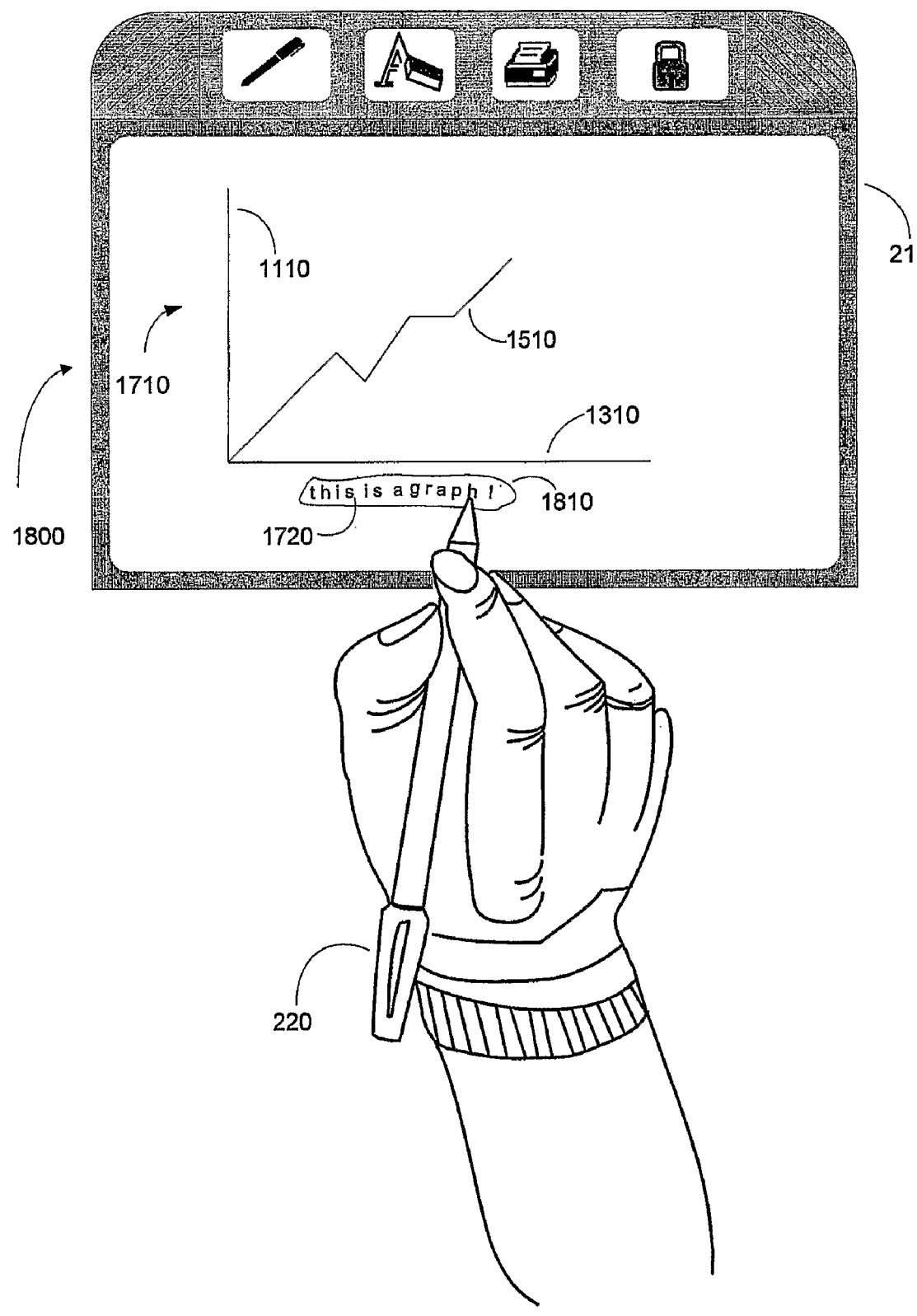

Referring now to FIG. 17, the screen shot 1700 illustrates the drawing of a next category of ink stream 1720 using the stylus 220. It can be seen in FIG. 17 that the category of ink stream being drawn using the stylus 220 is text. Therefore, it can be seen in FIG. 18 that the screen shot 1800 illustrates computing and updating of a next current selection bounding contour 1810 that substantially surrounds the next category of ink stream including one or more previously drawn traces to indicate formation of a new segment.

It can be seen from FIGS. 11-18 that the above described segmentation technique automatically segments the graph and text that is drawn using the stylus 220 on the digitizer 210 as two different segments by grouping them separately using the dynamically computed and updated current trace bounding contour and the current selection bounding contour. It can be envisioned that the system can be designed to input and store the two segments separately and to input the stored segments of data into a handwriting recognition engine separately for handwriting recognition.

Although the flowchart 100 includes steps 110-160 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present subject matter can be implemented in software, which may be run in the environment shown in FIG. 19 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 19:
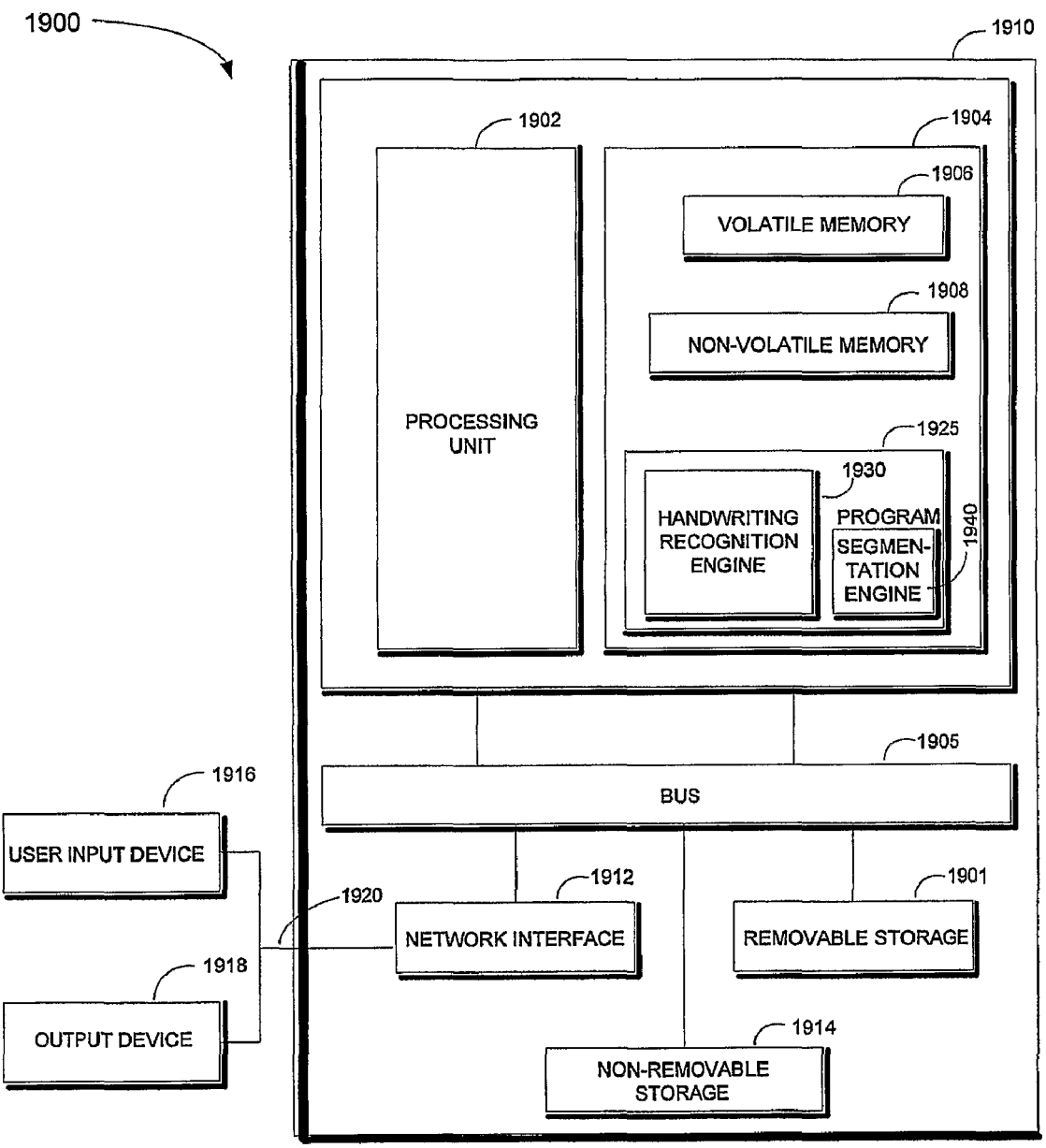
FIG. 19 is a block diagram of a typical computer system used for implementing embodiments of the present subject matter, such as those shown in FIGS. 1-18.

FIG. 19 shows an example of a suitable computing system environment for implementing embodiments of the present subject matter. FIG. 19 and the following discussion are intended to provide a brief, general description of a suitable computing environment in which certain embodiments of the inventive concepts contained herein may be implemented.

A general computing device, in the form of a computer 1910, may include a processing unit 1902, memory 1904, removable storage 1901, and non-removable storage 1914. Computer 1910 additionally includes a bus 1905 and a network interface (NI) 1912.

Computer 1910 may include or have access to a computing environment that includes one or more user input devices 1916, one or more output devices 1918, and one or more communication connections 1920 such as a network interface card or a USB connection. The one or more user input devices 1916 can be a digitizer and a stylus and the like. The one or more output devices 1918 can be a display device of computer, computer monitor, TV screen, plasma display, LCD display, display on a digitizer, display on an electronic tablet, and the like. The computer 1910 may operate in a networked environment using the communication connection 1920 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 1904 may include volatile memory 1906 and non-volatile memory 1908. A variety of computer-readable media may be stored in and accessed from the memory elements of computer 1910, such as volatile memory 1906 and non-volatile memory 1908, removable storage 1901 and non-removable storage 1914. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 1902 of the computer 1910. For example, a computer program 1925 may include machine-readable instructions capable of segmenting in real-time any inputted ink stream according to the teachings and herein described embodiments of the present subject matter. In one embodiment, the computer program 1925 may be included on a CD-ROM and loaded from the CD-ROM to a hard drive in non-volatile memory 1908. The machine-readable instructions cause the computer 1910 to encode according to the various embodiments of the present subject matter. As shown, the computer program 1925 includes a handwriting recognition engine 1930 and a segmentation engine 1940.

In operation, the segmentation engine 1940 initializes a current trace bonding contour upon a pen-up event by the user input device 1916. A current trace is then drawn using the user input device 1916. The segmentation engine then computes and updates the current trace bounding contour as a function of the drawn current trace. In these embodiments, the drawn current trace is dynamically displayed on the output device 1918.

The segmentation engine 1940 determines whether the drawn current trace is a first trace in the ink stream upon a pen-up event by the user input device 1916. The segmentation engine 1940 selects the drawn current trace, initializes a current selection bounding contour, computes a current selection bounding contour as a function of the drawn current trace and the trace bounding contour and replaces the trace bounding contour with the computed current selection bounding contour if the drawn current trace is the first trace in the ink stream. The output device 1918 displays the current trace along with the current selection bounding contour.

In some embodiments, the segmentation engine 1940 computes one or more spatial parameters between the current trace bounding contour and the current selection bounding contour. The segmentation engine 1940 then computes and updates the current selection bounding contour as a function of the one or more computed spatial parameters. The output device 1918 displays the drawn current trace and the one or more previously drawn traces along with the updated current selection bounding contour indicating to a user that the selection of the current trace along with the one or more previously drawn traces are part of a current segment.

The segmentation engine 1940 further determines whether the one or more computed spatial parameters is greater than a threshold value upon a pen-up event by the user input device 1916. The output device 1918 displays the current trace and the one or more previously drawn traces along with the current selection bounding contour indicating that the current trace and the one or more previously drawn traces are part of the current segment if the one or more computed spatial parameters are not greater than the threshold value.

The segmentation engine 1940 replaces the current selection bounding contour with a next selection bounding contour indicating a start of a next segment. Further, the segmentation engine 1940 removes the current selection bounding contour from the one or more previously drawn traces. In addition, the output device 1918 displays the one or more previously drawn traces in a first contrasting color and stores the one or more previously drawn traces as a current segment if the one or more computed spatial parameters are greater than the threshold value.

The operation of the computer system 1900 for dynamic segmentation of drawn ink stream is explained in more detail with reference to FIGS. 1-19.

The handwriting recognition engine 1930 and the segmentation engine 1940 of the present subject matter is modular and flexible in terms of usage in the form of a "Distributed Configurable Architecture". As a result, parts of the handwriting recognition engine may be placed at different points of a network, depending on the model chosen. For example, the handwriting recognition engine can be deployed in a server and the input and output data elements streamed over from a client to the server and back, respectively. The handwriting recognition engine can also be placed on each client, with the database management centralized. Such flexibility allows faster deployment to provide a cost effective solution to changing business needs.

Further, the above-described technique provides an uninterrupted rending and collection of ink stream input into a computer. In addition, this technique provides segmentation of pen input for online handwriting recognition. Furthermore, the above technique automates the segmentation for various categories of ink stream input. Moreover, this process accommodates ink stream units of varying sizes.

This process also allows chunking of pen input into various logical levels of text, such as character, subword, word, sentence, paragraph and so on. Further, the technique allows automatic categorization of pen input stream into text, graph, drawing, formulae, music tones, and so on. Furthermore, the technique allows for unconstrained writing and automatic segmentation and consequently obviates the need for having boxes for input. In addition, this process allows efficient use of active area of the digitizer by avoiding using statically determined writing areas. Also, the above segmentation technique allows efficient use of an active area of a digitizer by allowing the writing-in-line. Also, this process obviates the need for complex analysis on ink stream by accommodating prior information on the context. This process also adapts itself to a user by allowing the user to input segmentation parameters that suits the user's needs for ink stream segmentation and categorization.

Moreover, although the embodiments shown in FIGS. 2-18 are for Devanagari script, these embodiments are merely illustrative. The above-described segmentation and analyzing technique is not limited to the embodiments shown in FIGS. 2-18. Thus, the above-described technique can be used for any script, drawings, musical tones, formulae, graphs, and so on.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

The above-described technique provides various embodiments for triggering handwriting recognition. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described above with respect to the method illustrated in FIG. 1 can be performed in a different order from those shown and described herein.

FIGS. 1-19 are merely representational and are not drawn to scale. Certain proportions thereof may be exaggerated, while others may be minimized. FIGS. 1-19 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method comprising:
   drawing a current trace using a user input device;
   computing a current trace bounding contour as a function of the drawn current trace;
   dynamically displaying the drawn current trace on an output device;
   computing a current selection bounding contour as a function of the drawn current trace and the current trace bounding contour, wherein the current selection bounding contour includes one or more previously drawn traces;
   comparing the computed current trace bounding contour with the computed current selection bounding contour; and
   real-time segmenting of an ink stream including the current trace and the one or more previously drawn traces as a function of the comparison.

2. The method of claim 1, further comprising:
   repeating the computing, comparing, and real-time steps for a next drawn trace.

3. The method of claim 1, wherein computing the current trace bounding contour as a function of the drawn current trace comprises:
   initializing the current trace bounding contour upon occurrence of a pen-down event by the user input device comprising a stylus and a digitizer;
   drawing the current trace using the stylus on the digitizer; and
   dynamically computing and updating the initialized current trace bounding contour along with the drawing of the current trace as a function of the drawn current trace.

4. The method of claim 3, wherein computing the current selection bounding contour as a function of the drawn current trace and the current trace bounding contour comprises:
   determining whether the current trace is a first trace in the ink stream being drawn upon occurring of a pen-up event by the stylus; and
   if so, then selecting the drawn current trace, initializing the current selection bounding contour and computing the current selection bounding contour as a function of the current trace and the current trace bounding contour.

5. The method of claim 4, further comprising:
   displaying the drawn current trace along with the current selection bounding contour on the output device comprising the display of the digitizer.

6. A method for real-time segmentation of a drawn ink stream comprising:
   initializing a current trace bounding contour upon occurrence of a pen-down event by a stylus on a digitizer;
   drawing a current trace using the stylus on the digitizer;
   dynamically computing and updating the initialized current trace bounding contour along with the drawing of the current trace as a function of the drawn current trace;
   dynamically displaying the drawn current trace along with the computed and updated current trace bounding contour substantially simultaneously on the digitizer;
   determining whether the current trace is a first trace in the drawn ink stream upon occurring of a pen-up event by the stylus;
   if so, then selecting the drawn current trace, initializing a current selection bounding contour, computing the current selection bounding contour as a function of the current trace and the current trace bounding contour and replacing the current trace bounding contour with the current selection bounding contour; and
   displaying the drawn current trace along with the current selection bounding contour on the digitizer.

7. The method of claim 6, further comprising:
   if not, then computing spatial parameters between the current trace bounding contour and the current selection bounding contour;
   computing and updating the current selection bounding contour as a function of the computed spatial parameters;
   removing the current trace bounding contour from the digitizer; and
   displaying the drawn current trace and the one or more previously drawn traces along with the updated current selection bounding contour.

8. The method of claim 7, wherein the spatial parameters comprise parameters selected from the group comprising of overlap and nearness.

9. The method of claim 7, wherein dynamically updating the initialized current trace bounding contour along with the drawing of the current trace comprises:
   dynamically updating the current trace bounding contour along with the drawing of the current trace such that the current trace bounding contour substantially surrounds the current trace.

10. The method of claim 7, wherein, in displaying, the updated current selection bounding contour substantially surrounds the current trace along with the one or more previously drawn traces.

11. The method of claim 7, further comprising:
    determining whether there is another trace in the ink stream that needs to be drawn on the digitizer;
    if so, then repeating the above computing spatial parameters, removing, and displaying steps; and
    if not, then storing the drawn current trace and the one or more previously drawn traces along with the current selection bounding contour.

12. The method of claim 6, wherein dynamically displaying the updated current trace bounding contour comprises:
    dynamically displaying the updated current trace bounding contour in a first contrasting color on the digitizer.

13. The method of claim 6, wherein displaying the selection bounding contour on the digitizer comprises:
    displaying the selection bounding contour in a second contrasting color.

14. The method of claim 7, wherein displaying the drawn current trace and the one or more previously drawn traces along with the updated current selection bounding contour comprises:
    determining whether the computed spatial parameters for the drawn current trace is greater a threshold value; and
    if not, then displaying the drawn current trace and the one or more previously drawn traces along with the current selection bounding contour.

15. The method of claim 14, further comprising:
    if so, then displaying the one or more previously drawn traces along with a previously formed selection bounding contour substantially surrounding the one or more previously drawn traces;

removing the previously drawn selection bounding contour from the one or more previously drawn traces;

displaying the one or more previously drawn traces in a third contrasting color to indicate that the one or more previously drawn traces are part of the current segment;

storing the one or more previously drawn traces along with the current selection bounding contour; and and repeating the steps of claim 1 for the drawn current trace to start formation of a next segment.

16. The method of claim 7, wherein the one or more traces comprise traces associated with ink stream categories selected from the group consisting of drawing, musical tone, text, mathematical formula, graph, and symbol.

17. The method of claim 7, wherein, in computing, the spatial parameters are configurable by a user to facilitate entry of traces associated with ink stream categories selected from the group consisting of drawing, musical tone, text, symbol, mathematical formula, and graph.

18. The method of claim 6, wherein displaying the drawn current trace along with the selection bounding contour on the digitizer indicates a selection of the drawn trace.

19. The method of claim 6, wherein, in displaying, the selection bounding contour substantially surrounds the drawn current trace to provide a visual feedback of the boundary of the selected drawn current trace and to assist the user in drawing a subsequent trace so that the subsequent trace does not overlap the selected drawn current trace.

20. An article comprising:
a non-transitory computer readable storage medium having instructions that, when executed by a computing platform, result in execution of a method comprising:

computing a current trace bounding contour as a function of a drawn current trace;

computing a current selection bounding contour as a function of the drawn current trace and the current trace bounding contour, wherein the current selection bounding contour includes one or more previously drawn traces;

comparing the computed current trace bounding contour with the computed current selection bounding contour; and real-time segmenting a drawn ink stream including the current trace and the one or more previously drawn traces as a function of the comparison.

21. The article of claim 20, further comprising:
repeating the computing, comparing, and real-time steps for a next drawn trace.

22. The article of claim 20, wherein computing the current trace bounding contour as a function of the drawn current trace comprises:

initializing the current trace bounding contour upon occurring of a pen-down event by a stylus on a digitizer;

drawing the current trace using the stylus on the digitizer; and dynamically computing and updating the initialized current trace bounding contour along with the drawing of the current trace as a function of the drawn current trace.

23. The article of claim 22, further comprising:
dynamically displaying the drawn current trace.

24. The article of claim 22, wherein computing the current selection bounding contour as a function of the drawn current trace and the current trace bounding contour comprises:

determining whether the current trace is a first trace in the drawn ink stream upon occurrence of a pen-up event by the stylus; and if so, then selecting the drawn current trace, initializing the current selection bounding contour and computing the current selection bounding contour as a function of the current trace and the current trace bounding contour.

25. The article of claim 24, further comprising:
displaying the drawn current trace along with the current selection bounding contour on the digitizer.

26. An apparatus for segmentation of inputted ink stream comprising:

a digitizer and a stylus; and a segmentation engine implemented on a computing device coupled to the digitizer that is responsive to a pen-down event, the stylus on the digitizer, and a pen-up event, wherein the segmentation engine initializes a current trace bounding contour upon the pen-down event by the stylus on the digitizer, wherein a current trace is drawn using the stylus on the digitizer, wherein the initialized current trace bounding contour is dynamically computed and updated as a function of the drawn current trace by the segmentation engine, wherein the drawn current trace is dynamically displayed on the digitizer, wherein the segmentation engine determines whether the current trace is a first trace in the drawn ink stream upon the pen-up event by the stylus, wherein the segmentation engine selects the drawn current trace, initializes a current selection bounding contour, and computes the current selection bounding contour as a function of the current trace and the trace bounding contour and replaces the trace bounding contour with the current selection bounding contour if the drawn current trace is the first trace, and wherein the segmentation engine displays the current trace along with the current selection bounding contour on the digitizer.

27. The apparatus of claim 26, wherein the segmentation engine computes one or more spatial parameters between the current trace bounding contour and the current selection bounding contour, wherein the segmentation engine computes and updates the current selection bounding contour as a function of the one or more computed spatial parameters, and wherein the segmentation engine displays the drawn current trace and the one or more previously drawn traces along with the updated current selection bounding contour indicating that the selection of the current trace and the one or more previously drawn traces are part of a current segment.

28. The apparatus of claim 27, wherein the segmentation engine determines whether the one or more computed spatial parameters is greater than a threshold value, wherein the segmentation engine displays the current trace and the one or more previously drawn traces along with the current selection bounding contour indicating that the current trace and the one or more previously drawn traces are part of the current segment if the one or more computed spatial parameters are not greater than the threshold value, and wherein the segmentation engine replaces the current selection bounding contour with a next selection bounding contour indicating a start of a next segment and removes the current selection bounding contour from the one or more previously drawn traces and displays the one or more previously drawn traces in a first contrasting color and stores the one or more previously drawn traces as a current segment if the one or more computed spatial parameters are greater than the threshold value.

29. A computer system for triggering handwriting recognition comprising:

a network interface;

an input module coupled to the network interface that receives the input data via the network interface;

a processing unit;

a memory coupled to the processing unit;

a user input device;

an output device; and a segmentation engine stored in the memory coupled to the user input device and that is responsive to a pen-down event, a stylus on a digitizer of the user input device, and a pen-up event, wherein the segmentation engine initializes a current trace bounding contour upon the pen-down event by the stylus on the digitizer, wherein a current trace is drawn using the stylus on the digitizer, wherein the initialized current trace bounding contour is dynamically computed and updated as a function of the drawn current trace by the segmentation engine, wherein the drawn current trace is dynamically displayed on the output device, wherein the segmentation engine determines whether the current trace is a first trace in the drawn ink stream upon the pen-up event by the stylus, wherein the segmentation engine selects the drawn current trace, initializes a current selection bounding contour, and computes the current selection bounding contour as a function of the current trace and the trace bounding contour and replaces the trace bounding contour with the current selection bounding contour if the drawn current trace is the first trace, and wherein the output device displays the current trace along with the current selection bounding contour on the output device.

30. The system of claim 29, wherein the segmentation engine computes one or more spatial parameters between the current trace bounding contour and the current selection bounding contour, wherein the segmentation engine computes and updates the current selection bounding contour as a function of the one or more computed spatial parameters, and wherein the output device displays the drawn current trace and the one or more previously drawn traces along with the updated current selection bounding contour indicating that the selection of the current trace and the one or more previously drawn traces are part of a current segment.

31. The system of claim 30, further comprising:

a handwriting recognition engine coupled to the segmentation engine, wherein the segmentation engine determines whether the one or more computed spatial parameters is greater than a threshold value, wherein the output device displays the current trace and the one or more previously drawn traces along with the current selection bounding contour indicating that the current trace and the one or more previously drawn traces are part of the current segment if the one or more computed spatial parameters is not greater than the threshold value, and wherein the segmentation engine replaces the current selection bounding contour with a next selection bounding contour indicating the start of a next segment and removes the current selection bounding contour from the one or more previously drawn traces, and wherein the output device displays the one or more previously drawn traces in a first contrasting color, wherein the segmentation engine stores the one or more previously drawn traces as a current segment and inputs the one or more previously drawn traces into the handwriting recognition engine for character recognition if the one or more computed spatial parameters are greater than the threshold value.

* * * * *

UNITED STATES PATENT AND TRADEMARK OFFICE
CERTIFICATE OF CORRECTION

| | | |
|---|---|---|
| PATENT NO. | : 7,925,088 B2 | Page 1 of 1 |
| APPLICATION NO. | : 11/884747 | |
| DATED | : April 12, 2011 | |
| INVENTOR(S) | : Ajay Bhaskarabhatla | |

It is certified that error appears in the above-identified patent and that said Letters Patent is hereby corrected as shown below:

In column 13, line 8, in Claim 15, delete "and repeating" and insert -- repeating --, therefor.

Signed and Sealed this
Sixth Day of September, 2011

David J. Kappos
*Director of the United States Patent and Trademark Office*